US011737568B2

(12) United States Patent
Olarte

(10) Patent No.: US 11,737,568 B2
(45) Date of Patent: Aug. 29, 2023

(54) BEAM SEATING SYSTEM

(71) Applicant: Series International, LLC, Aventura, FL (US)

(72) Inventor: Alvaro Mauricio Olarte, Aventura, FL (US)

(73) Assignee: Series International, LLC, Aventura, FL (US)

( * ) Notice: Subject to any disclaimer, the term of this patent is extended or adjusted under 35 U.S.C. 154(b) by 0 days.

(21) Appl. No.: 17/314,839

(22) Filed: May 7, 2021

(65) Prior Publication Data

US 2021/0259426 A1 Aug. 26, 2021

Related U.S. Application Data

(63) Continuation-in-part of application No. 16/683,757, filed on Nov. 14, 2019, now Pat. No. 11,071,389, and
(Continued)

(51) Int. Cl.
*A47C 1/126* (2006.01)
*A47C 7/50* (2006.01)
(Continued)

(52) U.S. Cl.
CPC ............... *A47C 7/50* (2013.01); *A47C 1/12* (2013.01); *A47C 1/121* (2013.01); *A47C 1/124* (2013.01);
(Continued)

(58) Field of Classification Search
CPC .... A47C 7/50; A47C 7/56; A47C 7/26; A47C 7/32; A47C 7/563; A47C 7/566;
(Continued)

(56) References Cited

U.S. PATENT DOCUMENTS 146,432 A 3/1874 Close
358,976 A 3/1887 Jeczalik
(Continued)

FOREIGN PATENT DOCUMENTS

GB 2274391 A 7/1994
JP 01175564 A 7/1989
WO 2017155562 A1 9/2017

OTHER PUBLICATIONS

International Search Report and Written Opinion of the International Searching Authority for Application No. PCT/US19/61755, dated Mar. 20, 2020, Completion Date: Feb. 26, 2020, (23 pages total).

(Continued)

*Primary Examiner* — Nkeisha Smith
(74) *Attorney, Agent, or Firm* — ST. ONGE STEWARD JOHNSTON AND REENS

(57) ABSTRACT

A beam seating assembly has a frame supporting a seating surface. A beam secures to a first support and extends in a longitudinal direction. A channel is located the beam free of the first support. The frame has a lower portion with a connector that is insertable into the channel transverse to the longitudinal direction and the connector, once inserted into the channel, is retained from removal out of the channel in a direction. The connector is insertable into a first portion of the channel and a second portion of the connector rotatable into a second portion of the channel and then slidable away from the first portion such that the first and second portions of the connector are retained within the channel but are slidable in the longitudinal direction until the connector is fixedly secured to the beam. The frame is made in certain aspects from a flat plate.

20 Claims, 34 Drawing Sheets

Related U.S. Application Data a continuation of application No. 16/684,247, filed on Nov. 14, 2019, now Pat. No. 11,026,515.

(60) Provisional application No. 62/767,772, filed on Nov. 15, 2018, provisional application No. 62/767,772, filed on Nov. 15, 2018.

(51) Int. Cl.

| | | |
|---|---|---|
| *A47C 1/124* | (2006.01) | |
| *E04B 2/78* | (2006.01) | |
| *F16M 13/02* | (2006.01) | |
| *A47C 7/56* | (2006.01) | |
| *A47C 1/121* | (2006.01) | |
| *A47C 1/12* | (2006.01) | |

(52) U.S. Cl.
CPC ............... *A47C 1/126* (2013.01); *A47C 7/56* (2013.01); *E04B 2/78* (2013.01); *F16M 13/02* (2013.01)

(58) Field of Classification Search
CPC ......... A47C 7/72; A47C 3/0252; A47C 1/121; A47C 1/124; A47C 1/126; A47C 4/06; E04B 2/78
See application file for complete search history.

(56) References Cited

U.S. PATENT DOCUMENTS

| | | | |
|---|---|---|---|
| 1,374,467 A | 4/1921 | Park | |
| 1,800,387 A | 4/1931 | Greist | |
| 1,810,888 A | 6/1931 | Hanson | |
| 2,610,669 A | 9/1952 | Bromagem | |
| 3,114,575 A | 12/1963 | Eames | |
| 3,194,601 A * | 7/1965 | Hoven ..................... | A47C 7/56 297/336 |
| 3,233,939 A | 2/1966 | Chapman | |
| 3,305,044 A * | 2/1967 | Van Loo ................... | A47C 1/12 297/331 |
| 3,343,870 A | 9/1967 | Thatcher | |
| 3,657,854 A | 4/1972 | Tipton | |
| 3,727,975 A | 4/1973 | Anderson | |
| 3,762,765 A | 10/1973 | Piretti | |
| 3,885,766 A | 5/1975 | Resch et al. | |
| 3,889,999 A | 6/1975 | Mackintosh | |
| 3,960,405 A | 6/1976 | DeLong | |
| 4,000,586 A | 1/1977 | Vance et al. | |
| 4,052,101 A | 10/1977 | DeLong | |
| 4,054,316 A | 10/1977 | DeLong | |
| 4,126,354 A | 11/1978 | DeLong et al. | |
| 4,133,579 A | 1/1979 | Springfield | |
| 4,277,101 A | 7/1981 | Vogel | |
| 4,308,961 A | 1/1982 | Kunce | |
| 4,330,898 A | 5/1982 | Thompson | |
| 4,453,363 A | 6/1984 | Koller | |
| 4,493,172 A | 1/1985 | Jones | |
| 4,547,092 A | 10/1985 | Vetter et al. | |
| 4,694,531 A | 9/1987 | Foy | |
| 4,726,554 A | 2/1988 | Sorrell | |
| 4,790,594 A | 12/1988 | Temos | |
| 4,850,159 A | 7/1989 | Conner | |
| 4,865,377 A | 9/1989 | Musser | |
| 4,960,137 A | 10/1990 | Pott et al. | |
| 4,989,915 A * | 2/1991 | Hansal ................... | A47C 7/407 297/378.14 |
| 5,098,156 A | 3/1992 | Vogel | |
| 5,246,270 A | 9/1993 | Vogel | |
| 5,329,871 A | 7/1994 | Gibbs | |
| 5,342,110 A | 8/1994 | Merrick | |
| 5,375,914 A | 12/1994 | Donnelly | |
| 5,470,128 A | 11/1995 | Kerkham | |
| 5,598,785 A | 2/1997 | Zaguroli, Jr. | |
| 5,636,900 A | 6/1997 | Wilkie et al. | |
| 5,658,043 A | 8/1997 | Davidson | |
| 5,661,945 A | 9/1997 | Henriksson et al. | |
| 5,671,975 A | 9/1997 | Muller | |
| 5,984,417 A | 11/1999 | Wang | |
| 6,019,413 A | 2/2000 | Scraver | |
| 6,092,864 A | 7/2000 | Wycech et al. | |
| 6,095,603 A | 8/2000 | Hock | |
| 6,161,262 A | 12/2000 | Pfister | |
| 6,190,047 B1 | 2/2001 | Haag et al. | |
| 6,293,621 B1 | 9/2001 | Marsh et al. | |
| 6,296,222 B1 | 10/2001 | Whittaker | |
| 6,296,315 B1 | 10/2001 | Jensen | |
| 6,491,346 B1 | 12/2002 | Gupta et al. | |
| 6,499,158 B1 | 12/2002 | Easterling | |
| 6,578,922 B2 | 6/2003 | Khedira | |
| 6,683,394 B1 | 1/2004 | Gevaert | |
| 6,698,834 B2 | 3/2004 | Olarte | |
| 7,063,381 B2 | 6/2006 | Scahill | |
| 7,073,858 B2 * | 7/2006 | Fisher .................... | A47C 1/121 297/440.22 |
| 7,225,899 B2 | 6/2007 | Molnar et al. | |
| 7,303,235 B1 | 12/2007 | Fongers | |
| 7,478,876 B2 | 1/2009 | Olarte | |
| 7,828,380 B2 | 11/2010 | Olarte | |
| 7,866,689 B2 | 1/2011 | Saberan | |
| 7,882,795 B1 | 2/2011 | Snyder | |
| 7,901,004 B2 * | 3/2011 | Figueras Mitjans ...... | E04H 3/22 297/232 |
| 7,905,546 B2 * | 3/2011 | Conner .................. | A47C 7/407 297/217.7 |
| 7,950,739 B2 * | 5/2011 | King ...................... | A47C 1/121 297/335 |
| 8,414,072 B2 | 4/2013 | Phillips | |
| 8,490,335 B2 | 7/2013 | LaForest | |
| 8,491,053 B2 | 7/2013 | Stringer | |
| 8,662,322 B2 | 3/2014 | Magnusson et al. | |
| 8,820,836 B2 * | 9/2014 | Stewart .................... | A47C 1/12 297/335 |
| 8,960,454 B2 | 2/2015 | Magnusson et al. | |
| 8,968,041 B2 | 3/2015 | Rubbo | |
| 9,399,876 B2 * | 7/2016 | Magnus .................. | A47C 7/407 |
| 9,642,464 B2 | 5/2017 | Magnus | |
| 9,693,630 B2 * | 7/2017 | Jacobs .................... | A47C 7/30 |
| 9,873,354 B2 | 1/2018 | Poulos et al. | |
| 10,485,348 B1 | 11/2019 | Olarte | |
| 11,008,108 B2 * | 5/2021 | Gilbert ............... | B64D 11/0696 |
| 11,026,515 B2 * | 6/2021 | Olarte ....................... | A47C 7/50 |
| 2003/0062759 A1 | 4/2003 | Gupta et al. | |
| 2003/0090136 A1 | 5/2003 | Olarte | |
| 2004/0084943 A1 | 5/2004 | Fisher | |
| 2004/0100134 A1 | 5/2004 | Plant | |
| 2005/0127740 A1 | 6/2005 | Dowty | |
| 2005/0146180 A1 * | 7/2005 | Fisher .................. | A47C 11/005 297/248 |
| 2007/0017886 A1 | 1/2007 | Kao | |
| 2007/0029858 A1 | 2/2007 | Grable et al. | |
| 2007/0040090 A1 | 2/2007 | Fay | |
| 2010/0201165 A1 | 8/2010 | Dankovich | |
| 2011/0029123 A1 | 2/2011 | Olarte | |
| 2011/0108691 A1 | 5/2011 | Alves et al. | |
| 2014/0252836 A1 | 9/2014 | Olarte | |
| 2014/0325920 A1 | 11/2014 | Ugolini et al. | |
| 2015/0028641 A1 | 1/2015 | Stent et al. | |
| 2015/0374130 A1 | 12/2015 | Jacobs et al. | |
| 2021/0219728 A1 | 7/2021 | Plant | |

OTHER PUBLICATIONS

Canadian Office Action for Application # PCT US2019061755 dated Jul. 27, 2022.

* cited by examiner

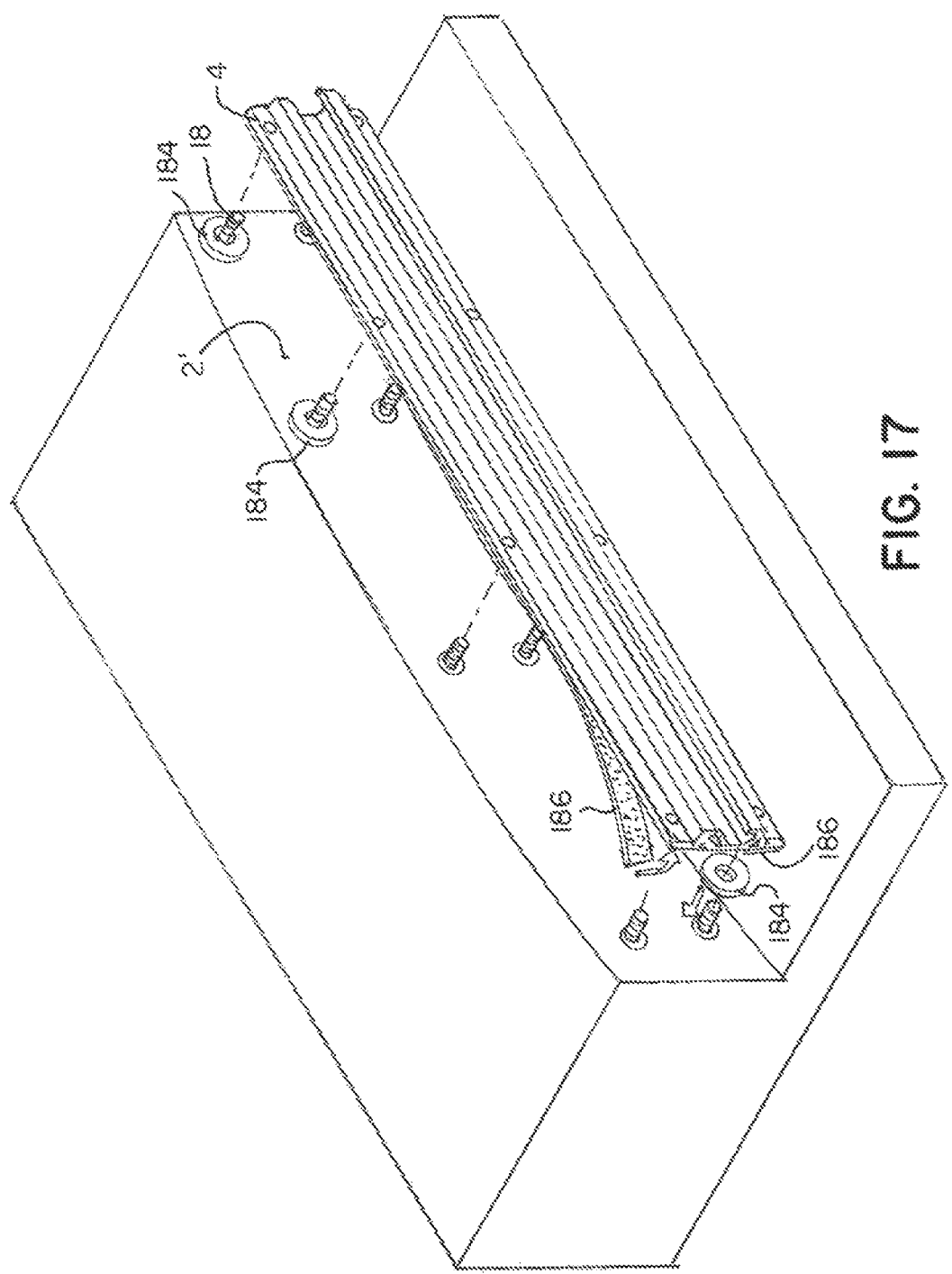

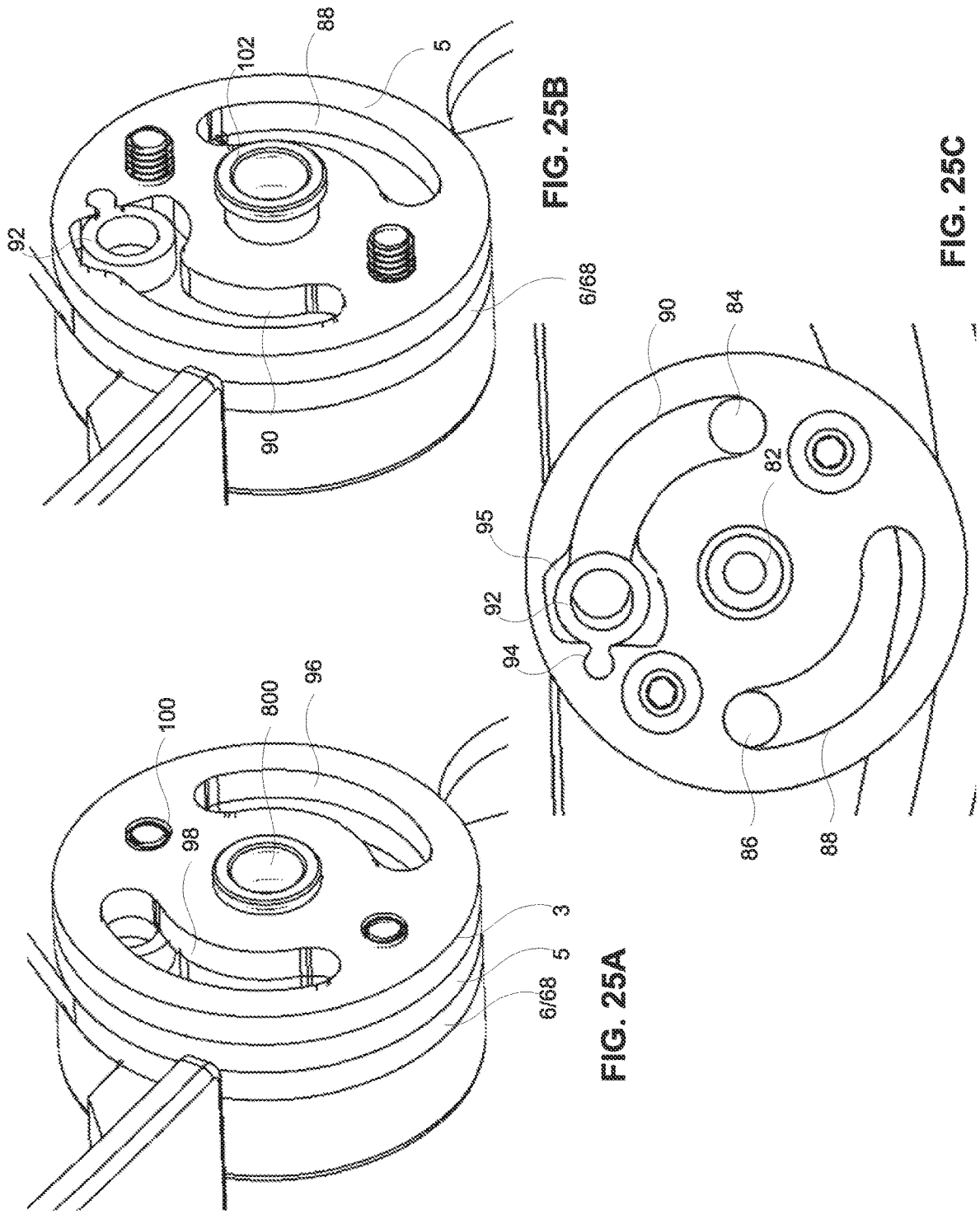

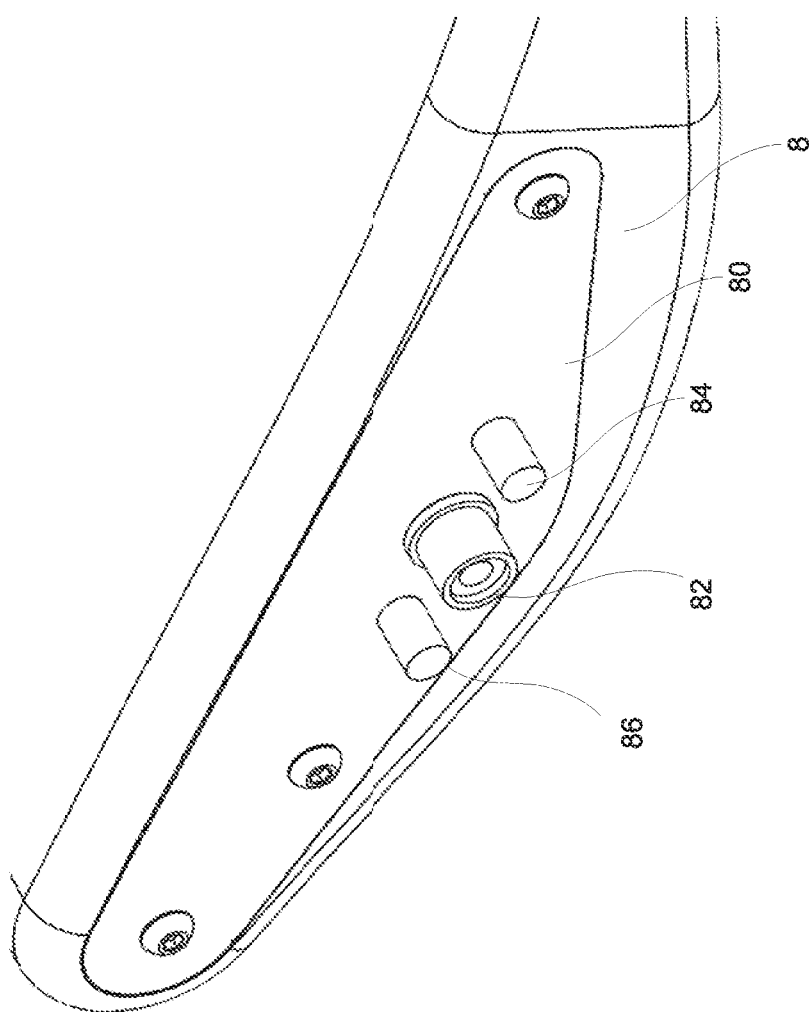

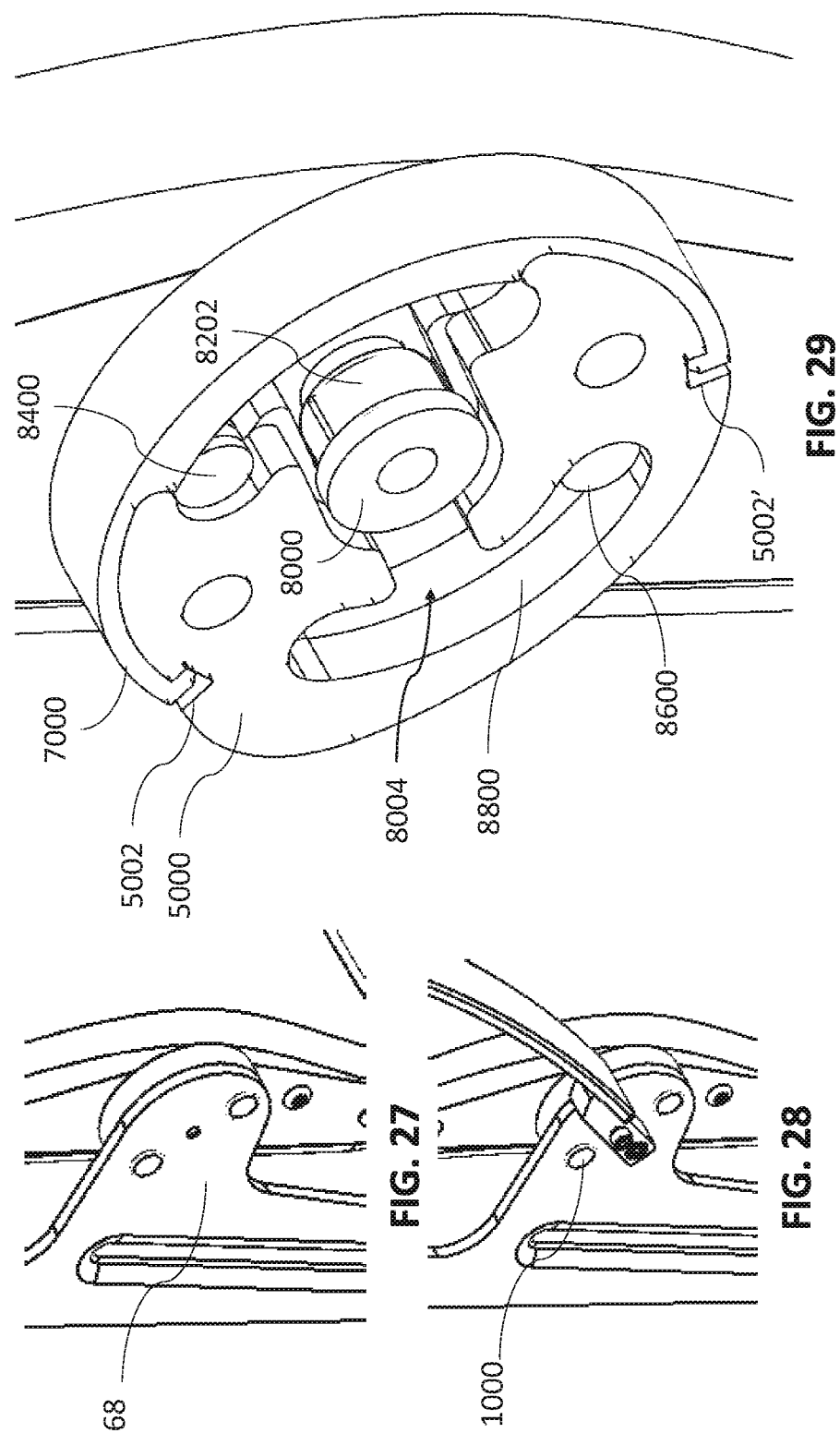

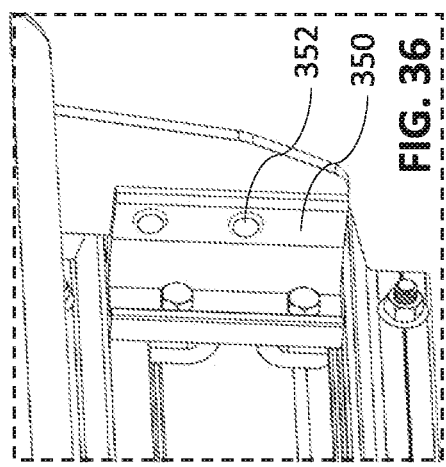
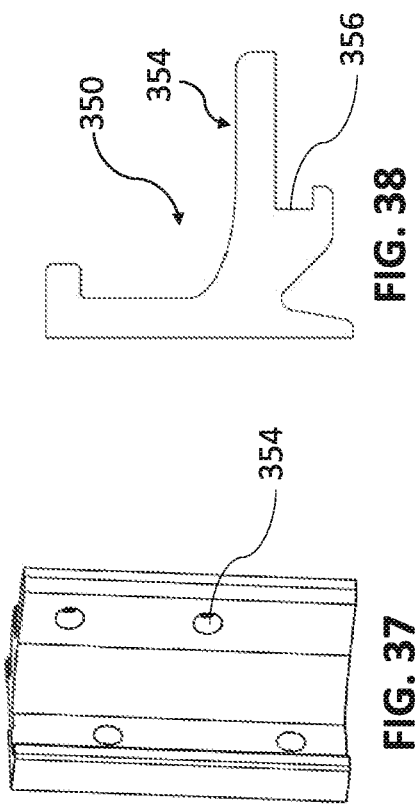
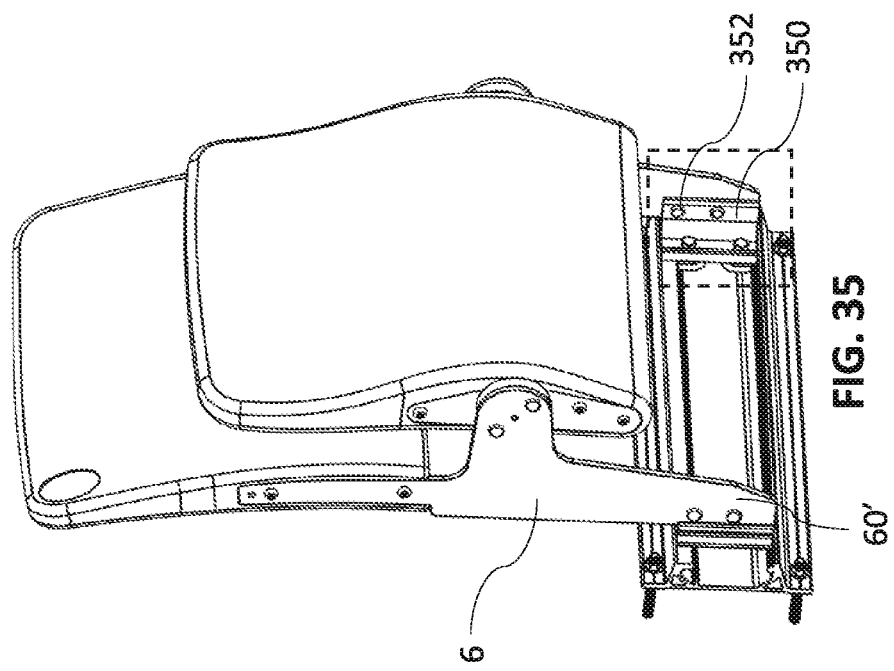

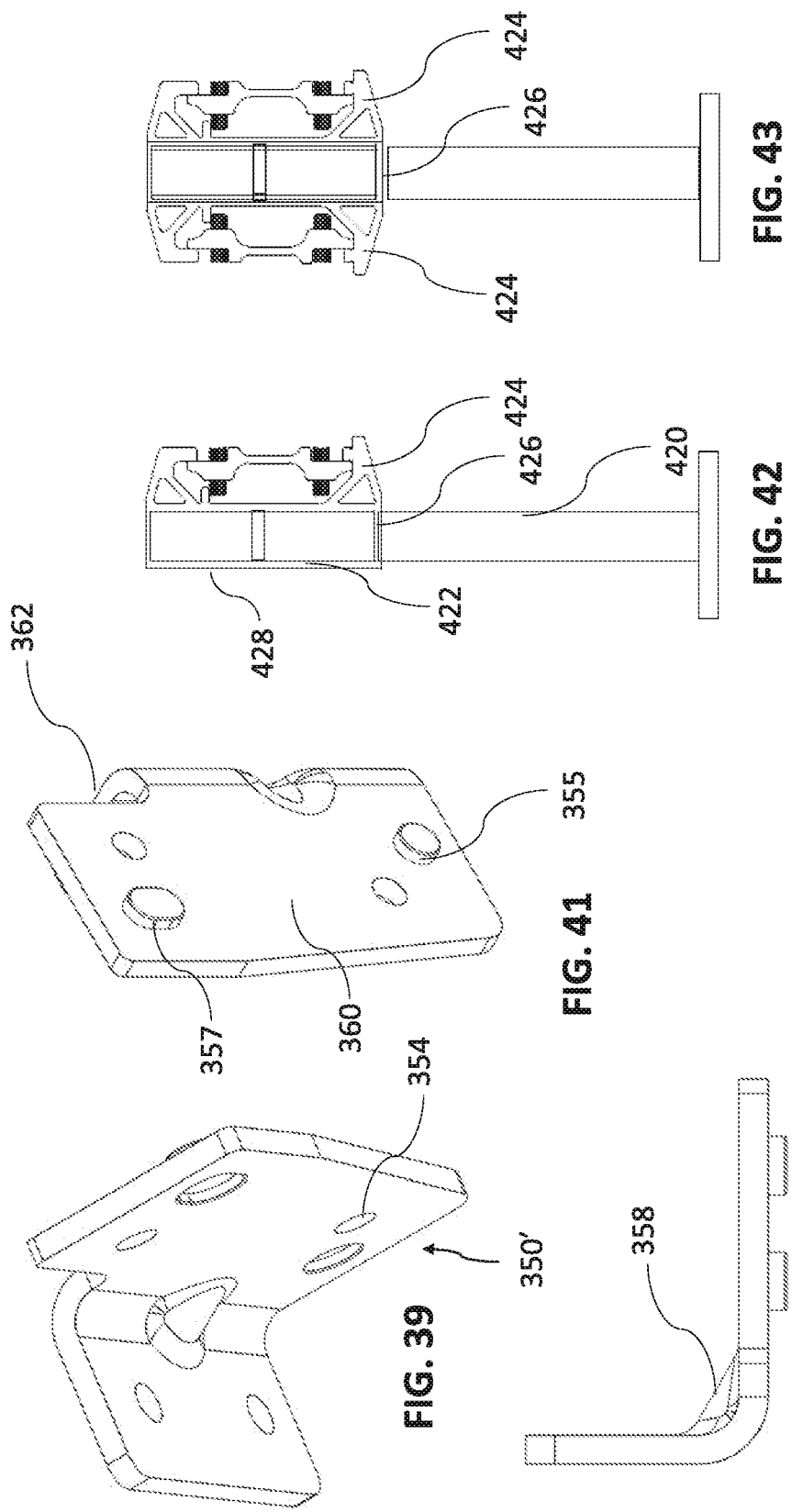

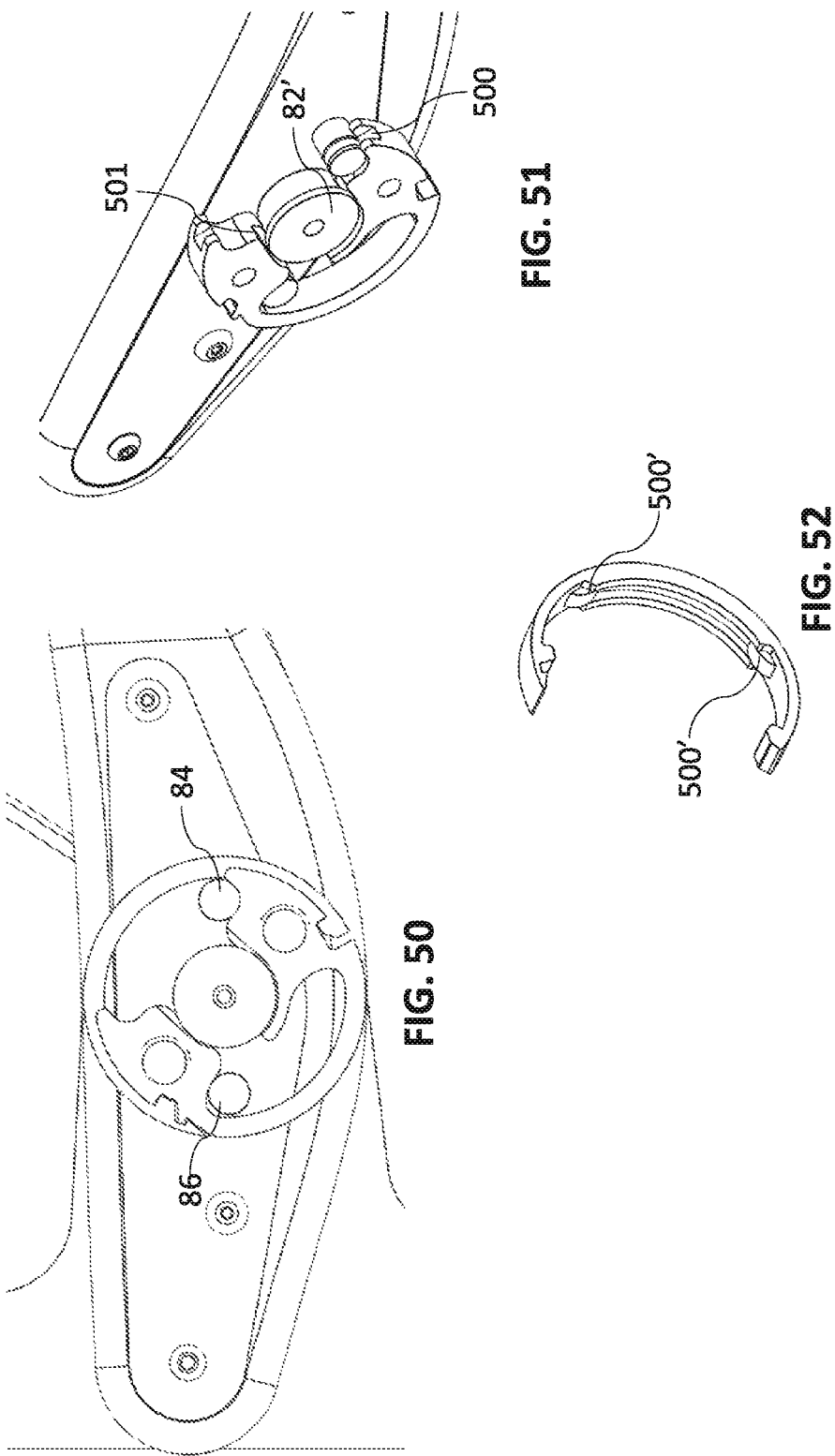

BEAM SEATING SYSTEM

FIELD OF THE INVENTION

The following relates to mounting systems. More particularly, the following relates to a beam based mounting system for support items such as chairs, tables, railings and others which are typically in large stadiums and auditoriums.

BACKGROUND OF THE INVENTION

Beam based seating has been provided in a number of different forms where a beam is supported along rows of seating and then the chairs are connected to that beam. These beam systems typically utilize large stair shaped risers in existing stadiums to secure to. Alternately, the beam is secured via supports to the floor of the stadium.

U.S. Pat. No. 7,073,858 is one such beam system where plates 23 are secured to the riser 32 and then a beam 10 is secured on top of that plate 23 at a distance away from the riser 32. The beam 10 is provided with structure which allows the seat support 60 which includes a clamp 68 and return portion 69 to secure over and then under the back of the beam to allow the seat to be supported by the beam. While this beam system does provide for mounting of beam based seating systems, there are a number of disadvantages. First, since the plates 23 are required to space the beam away from the riser 32, there is necessarily additional space taken up. In a large stadium, especially with new construction, one inch of space saved per row can add many additional rows in the sense that one inch per row eventually adds up to a new row. The '858 patent although providing for a convenient mounting method for the chairs, suffers the disadvantage of taking significant space and having a beam which projects out rather far from the concrete riser, which means the stadium is less flexible to utilizing the space with the seats removed, which may be desirable in certain instances.

The '858 patent also suffers the disadvantage that the plates 23 all need to be independently set level with one another, which can be a difficult task of lining up hundreds of these plates 23 in a particular job. Thus, it is desirable to eliminate or at least reduce the amount of leveling measurements required for proper installation of a beam system.

Further, the '858 patent requires use of rather complicated molds to create the support 60 with clamp/return 68/69 to secure to the beam in that typically a glass reinforced nylon material is used for the part of the support 60 which secures around the described rear overhang of the beam. Given that the beam extrusion is also custom and the mold for the support is too, the capital costs and manufacturing difficulties result in increased expense. Further, the glass reinforced nylon material can degrade over time when exposed to sunlight.

SUMMARY OF THE INVENTION

It is therefore an object of the present invention to provide a beam system for mounting chairs which takes up less space from the riser.

It is a further object to provide a beam system which is easier to install and less complicated to manufacture.

The terms "first" and "second" are used to distinguish one element, set, data, object or thing from another, and are not used to designate relative position or arrangement in time.

As used herein the term "angle" refers to a range of angles unless stated specifically that such angle is fixed (i.e. not a range).

These and other objects are achieved by providing a beam mounting system for chairs which provides a channel or opening for a connector to fit in from the front of the beam. The connector configured to secure the chair to the beam and one end of the connector insertable into one side of the channel and then rotatable and slidable within the channel transverse to the longitudinal direction such that the connector is securable to the elongated beam and retained in the channel by the elongated beam.

Further objects are achieved by providing a method of connecting support items such as furniture or railings to a beam system for stadiums which includes mounting a beam to a first support of a stadium and hanging support items from a protrusion of the beam using a connector which extends away from the first support and then clamping the Other objects are achieved by providing a chair frame for a fixed seat which has a leg portion, securing portion, back support portion and seat support portion formed from a bent and stamped plate such that the foregoing portions of the frame are formed from a single piece of metal. A bend is located between the leg and securing portions to provide a surface transverse to the leg portion. This surface can be mounted to a fixed support which may be a beam but could alternatively be other fixed supports such as concrete risers, floors or other riser or mounting types/options. The pivot mechanism is also provided and is manufactured from flat plates.

In certain aspects a beam system for mounting chairs is provided having an elongated beam configured to secure to a first support such that a rear face of the elongated beam faces the support. A front face of the elongated beam has a channel by an upper extension and a lower extension, the upper and lower extensions extending outwardly from the front face. An inner and upper face of the channel and an inner and lower face of the channel spaced apart at a first distance. The upper extension has a downwardly extending tab and the lower extension has an upwardly extending tab. A second distance is defined between innermost surfaces of the downwardly extending tab and the upwardly extending tab. A connector is configured to secure to a chair. The connector being configured to insert at least partially into the channel. A third distance is defined between a first and second edge of the connector, the first edge being an uppermost edge of the connector and the second edge being a lowermost edge of the connector. The third distance is larger than the second distance but smaller than the first distance such that the first edge of the connector is insertable into the channel at the upper extension at an angle relative to the rear face such that the second edge of the connector is outside of the channel and once inserted up towards the upper extension, the second edge of the connector is displaceable past the upwardly extending tab and once past the upwardly extending tab, the connector is displaceable downwardly such that the first and second edges are respectively retained by the downwardly extending and upwardly extending tabs.

In certain embodiments a chair support is connectable to the connector and is configured to clamp the upwardly and downwardly extending tabs between the connector and the chair support to clamp the chair support to the beam. A catch may be located in the channel, the catch is configured to interact with at least part of the chair support to inhibit movement of the first edge towards the upper extension. The catch interacts with a bolt of the chair support which secures to the connector and through a plate of the chair support. The bolt, when tightened, clamps the connector and plate together over the downwardly and upwardly extending tabs.

In certain aspects, the chair support includes a lower edge and a face of the lower extension is located outside the channel adjacent the upwardly extending tab and the inner and lower face which is located inside the channel adjacent the upwardly extending tab. The lowermost edge of the connector is configured to be supported by the inner and lower face. The lower edge of the chair support is configured to be supported by the face of the lower extension when the connector is clamped to the beam. The beam includes mounting tabs located outside the channel and including at least part of the rear face, a front face of the mounting tabs includes a notch therein extending in a longitudinal direction. A plurality of holes are located at the notch, the elongated beam is secured to the first support via the plurality of holes. In certain aspects, the angle is a range of angles and in other aspects, the angle is a fixed angle. In certain aspects a railing is provided with a plurality of supports connected to the railing at one end and a second end of each of the plurality of supports including the connector such that the railing is configured to secure to the beam by the connectors of the first supports located adjacent at least one of the connectors of the chair. In certain aspects a plurality of holes are spaced along the longitudinal direction of the beam and located within the channel and extending through the beam and the beam secures to said first support through the holes with anchors.

In other aspects, a beam mounting system for chairs is provided including an elongated beam having a channel. A connector is configured to fit into and be retained in the channel. The connector is configured to mount a chair to the elongated beam. A first portion of the connector is insertable into a first portion of the channel and slidable in a first direction at a first angle such that a second portion of the connector opposite the first portion of the connector is thereby insertable into a second portion of the channel after the connector has been slid in the first direction. The connector, once slid in the first direction, is rotatable from the first angle to a second angle such that during rotation to the second angle, a second portion of the connector passes an obstruction which is part of the beam and once the second portion of the connector passes the obstruction, the connector is slidable at the second angle into a second portion of the beam opposite the first portion of the beam and thereby the connector is: inhibited from rotating towards the first angle by the obstruction until the connector is first slid opposite the first direction; and inhibited from moving out of the channel by the first portion of said channel such that a chair connected to the connector is supported by said elongated beam.

In certain aspects the beam includes an outer face oriented inwardly with respect to the channel and positioned adjacent the obstruction, the outer face interacts with a frame of the chair to support the chair and inhibit movement in the first direction beyond a predetermined position. In certain aspects the first angle is a fixed angle. In other aspects the second angle is a fixed angle. In other aspects the first and second angles are both fixed angles. In certain aspects the first portion of the connector is an upper portion of the connector and the first portion of the channel is an upper portion of the channel. The second portion of the connector is a lower portion of the connector; and the second portion of the channel is a lower portion of the channel. In certain aspects, the elongated beam is mounted to a first support and a plurality of chairs each having one or more connectors are mounted to the elongated beam.

In certain embodiments a method installing a beam seating system is provided including one or more of the steps of providing a plurality of chairs, each having at least one connector; providing an elongate beam having a channel on a front face thereof, the channel configured to receive the connector; securing the elongate beam to one or more supports; inserting the connectors into a first portion of the channel and rotating the connectors such that a second portion of the connector passes over an obstruction on the elongate beam; sliding the connectors in a first direction such that the obstruction inhibits rotation of the second portion out of the channel; and securing the connectors to the elongate beam with one or more fasteners.

In certain aspects the securing step causes the connectors and a seat support to which the connector is attached to clamp the obstruction between the connector and the seat support. In other aspects, the channel includes a catch therein and the fasteners engage the catch to inhibit sliding movement in a second direction opposite the first direction. In other aspects, the step of securing the elongated beam comprises drilling a plurality of holes in the beam and anchoring the elongated beam through the plurality of holes. In other aspects, the connector is a flat plate.

In other embodiments a seating assembly is provided with a frame supporting a seating surface. A beam is configured to secure to a first support with a first face of said beam facing said first support, the beam extends in a longitudinal direction. A channel is located in a second face of the beam. The frame has a lower portion with a connector attached thereto, the connector is insertable into the channel from a direction transverse to the longitudinal direction.

In certain aspects the connector is insertable into a first portion of the channel and a second portion of the connector rotatable into a second portion of the channel and then the connector is slidable away from a deepest part of the first portion in a sliding direction such that the first and second portions of the connector are retained within the first and second portions of the channel but are slidable in the longitudinal direction until the connector is fixedly secured to the beam. In other aspects, a catch is located in the channel and a portion of the connector configured to interact with the catch to inhibit movement opposite the sliding direction. In other aspects, the portion of the connector is a bolt which secures the connector to said frame. In other aspects, the frame is formed from a metal plate which is stamped and the first portion is formed by bending part of said metal plate relative to an adjacent portion of the frame.

In other embodiments a beam mounting system for chairs is provided with a beam having a longitudinal channel in a front face thereof and the channel extending in a longitudinal direction, the beam securable to a first support. A chair, has a connector secured thereto, the connector configured to secure to the beam by the connector inserting into the channel from the front face at any position along the beam. The connector is slidable within the channel in the longitudinal direction without interference from the first support until the connector is securely affixed to the beam such that the connector ceases to be slidable in the longitudinal direction. When the connector is securely affixed to the beam the connector secures to the beam without interaction with a rear face of the beam.

In certain aspects the chair includes a plurality of chairs securable at any position along the beam not occupied by another one of the plurality of chairs. In other aspects the connector includes a threaded hole which connects to a bolt secured to the chair and at least one post is located adjacent the threaded hole and extends to an end of the post such that the post bears against at least part of the chair when at least part of the beam is clamped between the chair and the connector.

In one aspect a fixed chair for stadium or auditorium seating is provided with a metal frame including four portions. The four portions include a securing portion, a leg portion, a back support portion and a seat support portion. The four portions are made together from a single flat plate which is stamped and bent. At least part of the leg portion includes a stamping therein which creates a raised portion of said single plate relative to an adjacent portion. A bend in the single plate between the leg portion and the securing portion is provides so that the securing portion and the leg portion are transverse to each other. The securing portion attaches to a fixed support such that the fixed chair is cantilevered from the securing portion.

In certain aspects a backrest is connected to the back support portion. A pivot element is connected to the seat support portion and a seat is connected to and configured to rotate about the pivot element between occupied and unoccupied positions. In certain aspects at least two pins extend from the seat and interact with the pivot. The pivot includes two plates having at least two holes. A first one of the holes receives a first one of the two pins allowing the first pin to rotate in the first hole about an axis. A second one of the at least two holes in each of the two plates is slot shaped such that when the first pin rotates in the first hole, the second pin moves along the slot. A bumper is located in at least one of the second holes. In certain aspects a first one of the two plates is an inner plate and a second one of the two plates is a middle plate located between the inner plate and the seat support portion. The slot of the middle plate has a second slot along a direction of the axis which holds the bumper therein at one end of the slot. The slot of the inner plate configured to inhibit removal of the bumper from the middle plate along the direction. In certain aspects the bend is approximately a 90 degree angle. In other aspects, the fixed support is a beam.

In certain aspects at least two pins extend from the seat and interact with the pivot. The pivot is comprised of two plates, each plate having at least two holes, a first one of said at least two holes in each of the two plates receives a first one of said at least two pins therein, allowing the first pin to rotate in the first hole about an axis. A second one of the at least two holes in each of the two plates is slot shaped such that when said first pin rotates in the first hole, the second pin moves along the slot. The first hole in the first plate is larger than the first hole in the second plate and the first one of said at least two pins includes a catch at one end which inhibits movement of the first one of said at least two pins in at least one direction along the axis due to the smaller first hole in the second plate being smaller than a dimension of the catch.

In one aspect a chair is provided with a metal frame having first and second pieces, the first and second pieces each including four portions and the first and second pieces spaced apart. The four portions include a securing portion, a leg portion, a back support portion and a seat support portion. The four portions are made together from a single flat plate which is stamped and bent. At least part of the leg portion includes a stamping therein which creates a raised portion of said single plate relative to an adjacent portion. A bend in the single plate is between the leg portion and the securing portion such that the securing portion and the leg portion are transverse to each other. A backrest is connected between the two back support portions of the first and second pieces. A seat is connected between the two seat support portions of the first and second pieces. The backrest and seat are supported entirely by the securing portions and through the leg portions of the first and second pieces such that the chair is cantilevered from a first support secured to the securing portions.

In certain aspects, the bend is approximately a 90 degree angle. In other aspects, first support is a beam or a fixed support. In other aspects a pivot element is connected to each seat support portion and the seat is connected to and configured to rotate about said the element between occupied and unoccupied positions. In other aspects at least two pins extend from the seat and interact with the pivot. The pivot is made of two plates, each plate has at least two holes. A first one the two holes in each of the two plates receives a first one of the two pins therein and is located at an axis and allows the first pin to rotate in the first hole about the axis. A second one of the two holes in each of the two plates is slot shaped such that when the first pin rotates in the first hole, the second pin moves along the slot. A bumper located in at least one of the second holes. In further aspects a first one of the two plates is an inner plate and a second one of the two plates is a middle plate located between the inner plate and the seat support portion. The slot of the middle plate has a second slot which holds the bumper therein at one end of the slot. The slot of the inner plate is configured to inhibit removal of the bumper from the middle plate along the direction. In additional aspects, the second slot is part of an opening containing the slot and the second slot. In still other aspects an outermost edge of the second one of said two holes is spaced apart from the axis at a distance and a first distance of seat is at least as long as the distance, the first distance measured from the first one of the at least two pins to a first surface transverse to a surface from which the first one of the at least two pins extends.

In further aspects a seat pivot mechanism is provided including a seat having at least two pins extending therefrom. At least two plates are provided, each has at least two holes, a first one of said at least two holes in each of the two plates receives a first one of the at least two pins therein, allowing the first pin to rotate in the first hole about an axis. A second one of the at least two holes in each of the two plates is slot shaped such that when said first pin rotates in the first hole, the second pin moves along the slot. A bumper is located in at least one of the second holes. A first one of the two plates is an inner plate, a second one of the two plates being a middle plate located between the inner plate and a seat support. The slot of the middle plate has a second slot which holds the bumper therein at one end of the slot. The slot of the inner plate configured to inhibit removal of the bumper from the middle plate along the direction.

In certain aspects the slots of the inner and middle plates include a semi-circular section. In other aspects the at least two pins includes at least three pins and the first pin is a middle pin between the second and a third pin, and the first and second plates comprising a third hole which is slot shaped and configured to receive the third pin and allow the first or second pin to move along said third hole. In other aspects the second hole includes two concentric circular sections spaced apart at a distance at least as large as a diameter of the second pin. In other aspects ends of the second hole provide stops which define occupied and unoccupied positions of the seat.

In certain aspects the at least two holes and the at least two pins are configured such that at an insertion angle, the at least two pins are insertable in a direction perpendicular to the axis into the mechanism such that the second pin inserts through both the first and second ones of the at least two holes in the direction and such that once inserted, the second pin inhibits movement of the seat in the direction. In other aspects the first pin comprises a catch extending from an end thereof in a direction outwards with respect to the axis and the catch and first hole of the inner plate are dimensioned so as to inhibit movement of the first pin along the axis out of the mechanism.

In further aspects a seat pivot mechanism includes a seat having at least a first and a second pin extending therefrom. Two plates are provided with each plate having a slot. A first portion of the slot is configured to support the first pin and allow the first pin to rotate about an axis passing through a center of the first pin. A second portion of the slot is configured to receive the second pin and allow the second pin to move along a radial path defined by a distance between the first and second pins such that the second portion of the slot includes first and second stops which interact with the second pin at open and closed positions of the seat to arrest movement of the second pin along the radial path. The first and second portions of the slot are in communication such that at an insertion angle, the second pin is insertable in a direction perpendicular to the axis into the slot in a manner that the second pin passes the first portion of the slot prior to being positioned in the second portion of the slot. A catch extends from an end of the first pin in an outward direction with respect to the axis, wherein the first portion of the slot in a first one of the plates is narrower than the first portion of the slot in a second one of the plates such that the catch is inhibited from removal from the first portion of the slot in a direction along the axis.

In further aspects a method of manufacturing a plurality of chairs is provided including one or more of the steps of: providing a plurality of frame pieces, each frame piece cut from one or more flat plates utilizing a two dimensional cutting pattern such that at least two of the plurality of frame pieces were cut from one flat plate, each frame piece comprising four portions which are a securing portion, a leg portion, a back support portion and a seat support portion; providing a plurality of backrests and connecting each backrest between the two back supports of two of the plurality of frame pieces; providing a plurality of seats and connecting each seat between the two seat support portions of the two of the plurality of frame pieces, the backrest and seat supported entirely by the securing portions and through the leg portions of the first and second pieces such that each chair is configured to be cantilevered from a first support secured to the securing portions and connection of the chair to the first support is a removable connection.

In certain aspects the seat has at least two pins extending therefrom and at least two plates are connected to the two of the plurality of frame pieces, has at least two holes, a first one of said at least two holes in each of the two plates receives a first one of said at least two pins therein, allowing the first pin to rotate in the first hole about an axis, a second one of said at least two holes in each of the two plates is slot shaped such that when said first pin rotates in the first hole, the second pin moves along the slot, a first one of the two plates being an inner plate, a second one of the two plates being a middle plate located between the inner plate and a seat support, the slot of the middle plate having a second slot which holds the bumper therein at one end of the slot. In other aspects the plurality of frame pieces are provided with a bend between the securing portion and the leg support portion. In further aspects the securing portion has one or more holes therein and a connector part is secured through the one or more holes to the securing portion, the connector part including a face transverse to a face of the securing portion through which the one or more holes pass. In other aspects, the removable connection allows for separation from the first support by loosening fewer than six fasteners. In other aspects the removable connection allows for separation from the first support by loosening four or fewer fasteners. In certain aspects separation following loosening requires one or more of a sliding and a rotating movement of the frame pieces corresponding to each chair.

In certain aspects a method of providing a beam mounting system for auditoriums includes one or more of the steps of: providing a beam which is elongated along a length between two ends; securing the beam to a first support such that a rear face of the beam faces the first support and the beam protrudes outwards with respect to the first support wherein a distance between the rear face and the first support is less than 50% a maximum amount which the beam protrudes with respect to the rear face; mounting a plurality of support items to the beam from a side other than the two ends of the beam such that a connector of each support item hangs from beam to allow the support item to slide along the length but be retained in a direction transverse the length such that the connector is slidable without interference other than from other support items and corresponding connectors also hung from the beam; tightening the connector of each support item such that the connector clamps the beam such that the support item is no longer slidable along the length.

In certain aspects the first support is a concrete riser. In other aspects the step of securing the beam to the first support comprises drilling a plurality of holes in the first support and securing the beam to the first support through the beam with anchors which pass through the beam and into respective ones of the plurality of holes. In other aspects the step of securing the beam further comprises providing one or more shims and positioning said shims between the first face and the first support such that the shims are clamped between the first face and the first support. In other aspects securing includes drilling a plurality of holes in the first support includes aligning the beam with the first support and drilling through the beam and the first support. In certain aspects the beam includes a notch extending longitudinally along the beam and the securing includes drilling of the holes through the notch. In certain aspects the connector mounts inside a channel of the beam and clamps the beam between the connector and the support item. In certain aspects the distance between the rear face and the first support is less than 10% of the maximum amount. In certain aspects, the distance between the rear face and the first support is less 10 cm, more preferably less than 5 cm and more preferably less than 2 cm. In certain aspects wherein the beam protrudes away from the first support to provide a channel with an opening facing away from the first support such that the connector is inserted into the channel without interacting directly with the rear face of the beam. In certain aspects the beam protrudes away from the first support to provide at least once catch with a channel positioned between the catch and the rear face, the catch facing upwards or rearwards or forwards and the connector configured to fit over the catch and into the channel to mount the support item to the beam. In certain aspects the support items hang from the beam without the connector contacting the rear face. In certain aspects the support item is a chair. In certain aspects the securing step includes providing anchors which pass through holes in the beam and into the first support and wherein a distance from the first support to the rear face of the beam is less than a thickness of the beam where the anchors pass through the beam. In certain aspects said securing step includes placing one or more spacers between the beam and the first support. In certain aspects the one or more spacers includes a shim which adjusts positioning of the beam to account for irregularities in the first support. In further aspects the support item is a railing. In certain aspects the securing step includes providing anchors which pass through holes in the beam and into the first support, the holes positioned in intervals along the length of the beam. In certain aspects the holes are positioned within a channel of the beam and the connector inserts into the channel such that the hole is between the connector and the first support. In other aspects the non-metallic spacer inhibits corrosion between the beam and concrete of the first support. In certain aspects the first support includes a curved upright wall and said securing step further comprises: anchoring a portion of the beam to conform to the curve of the upright wall such that the anchoring causes the beam to bend, the bending moving the first face of the beam closer to the vertical wall and the anchoring holding the beam in a bent configuration. In certain aspects the anchoring step includes anchoring the beam proximate to a first end of the beam and progressively anchoring the beam to the first support starting proximate the first end and moving towards a second end of the beam such that each anchor progressively bends the beam. In further aspects the mounting step comprises inserting an upper end of the connector into an upper end of a channel in the protrusion of the beam and rotating a bottom end of the connector past an obstruction on a bottom portion of the channel; and the tightening step comprises securing the connector to the beam such that the obstruction is clamped between the connector and a support of the one or more support items and the upper end of the connector is retained in the upper end of the channel.

In other aspects a method of installing a beam mounting system on a curved riser includes one or more of the steps of: providing an beam which has a length and which is elongated and substantially straight in a direction and has a first face and a second face, the second face containing a protrusion configured to receive a connector which hangs from the protrusion to mount a support item connected to the connector to the beam; positioning the beam adjacent a first support, the first support including an upright wall which is curved; anchoring a portion of the beam to conform to the curve of the upright wall such that the anchoring causes the beam to bend, the bending moving the first face of the beam closer to the vertical wall and the anchoring holding the beam in a bent configuration; mounting one or more support items to the beam by hanging the connector from the protrusion.

In certain aspects the protrusion defines a channel and the hanging includes inserting the connector into the channel. In other aspects the bend in the beam is created without use of hydraulic or electric bending tools other than tools used in the anchoring step.

In other aspects a method of providing a beam mounting system for auditoriums includes one or more of the steps of: providing a beam which is elongated along a length; securing the beam to a first support such that a bottom face of the beam faces the first support and the beam includes a protrusion which protrudes upwards with respect to the first support, the first support comprising a concrete floor; mounting a plurality of support items to the beam from a side other than ends of the beam such that a connector of each support item clamps to the beam without interaction with a bottom of the beam to allow the support item to slide along the length but be retained in a direction transverse the length; tightening the connector of each support item to clamp the connector to the beam without penetrating the beam such that the support item is no longer slidable along the length.

In other aspects a method of installing a beam mounting system on a curved riser includes one or more of the steps of: providing an beam which has a length and which is elongated in a direction and has a first face and a second face, the second face configured to receive a connector securable to a support item which is mounted the beam, wherein the beam is metallic; positioning the beam adjacent a first support which comprises concrete, the first support including a wall with one or more spacers between the beam and the first support; anchoring a portion of the beam with a plurality of spaced anchors located between the two ends of the beam, the spaced anchors extending into the wall approximately perpendicular to the wall and the first face, the anchoring pressing the one or more spacers between the first wall and the beam and the one or more spacers separating the metal of the beam from the concrete of the first support.

In certain aspects the one or more spacers are non-metallic and the beam is aluminum. In certain aspects the method includes mounting a plurality of support items to the beam via the connector of each support item.

In other aspects a method of installing a beam seating system includes one or more of the steps of: providing a plurality of chairs, each having at least one connector; providing an elongate beam having a first face and a protrusion extending from a second face of the beam, the protrusion configured to secure to the connector; securing the elongate beam to a support such that the first face faces the supports and a non-metallic spacer is clamped between the first face and the support; connecting the connectors to the elongate beam.

In other aspects the method includes connecting the connectors to the beam comprises inserting the connectors from the front face into a first portion of the channel and rotating the connectors such that a second portion of the connector passes over an obstruction on the elongate beam, sliding the connectors in a first direction such that the obstruction inhibits rotation of the second portion out of the channel and securing the connectors to the beam with one or more fasteners. In certain aspects said plurality of chairs comprises a number of chairs (N), and said securing step comprises securing the beam to the support using a number of anchors (A) which are spaced with respect to each other along a longitudinal length of the elongate beam such that A is greater than $(N+1) \times 0.5$ and A is less than $(N+1) \times 1.75$. In other aspects the method includes providing an elongate railing having a plurality of railing supports, the railing supports connected to the elongate railing at one end and including one of the at least one connector at another end of the railing supports; connecting the connectors of the elongate railing to the elongate beam such that the elongate beam supports the elongate railing;

In certain aspects the connectors are connected and the railing and plurality of railing supports such that the railing is positioned: above, behind or above and behind the elongate beam.

In other aspects a method of installing a beam mounting system includes one or more of: providing an elongate beam; providing a plurality of chairs, each having at least one connector, said plurality of chairs comprises a number of chairs (N); securing the elongate beam to a support using a number of anchors (A) which pass through the elongate beam and are spaced with respect to each other along a longitudinal length of the elongate beam such that A is greater than $(N+1) \times 0.5$ and A is less than $(N+1) \times 1.75$;

securing said connector of said plurality of chairs to the elongate beam to thereby secure the plurality of chairs to the support.

In other aspects the first face faces the support and the first face is located relative to the first support less than 50% of a distance from the first support to a maximum extension of the beam perpendicular to the first support and the elongate beam is secured to the support.

In certain aspects a fixed chair for stadium or auditorium seating includes a metal frame including four portions comprised of a securing portion, a leg portion, a back support portion and a seat support portion, the four portions made together from a single flat plate which is stamped and bent wherein at least part of the leg portion includes a stamping therein which creates a raised portion of said single plate relative to an adjacent portion. A bend in said single plate between said leg portion and said securing portion such that said securing portion and said leg portion are transverse to each other. The securing portion is configured to attach to a fixed support such that the fixed chair is cantilevered from said securing portion. In certain aspects a backrest is connected to said back support portion and a pivot element is connected to said seat support portion and a seat connected to and configured to rotate about said pivot element between occupied and unoccupied positions. In certain aspects at least two pins extend from said seat and interacting with said pivot and said pivot comprised of two plates, each plate having at least two holes, a first one of said at least two holes in each of the two plates receives a first one of said at least two pins therein, allowing the first pin to rotate in the first hole about an axis. A second one of said at least two holes in each of the two plates is slot shaped such that when said first pin rotates in the first hole, the second pin moves along the slot.

In certain aspects one of the two plates being an inner plate, a second one of the two plates being a middle plate located between the inner plate and the seat support portion. The slot of the middle plate having a second slot along a direction of the axis which holds the bumper therein at one end of the slot. The slot of the inner plate is configured to inhibit removal of a bumper from the middle plate along the direction. In other aspects at least two pins extend from said seat and interact with said pivot and said pivot comprised of two plates, each plate having at least two holes, a first one of said at least two holes in each of the two plates receives a first one of said at least two pins therein, allowing the first pin to rotate in the first hole about an axis. A second one of said at least two holes in each of the two plates is slot shaped such that when said first pin rotates in the first hole, the second pin moves along the slot. The first hole in the first plate is larger than the first hole in the second plate and the first one of said at least two pins includes a catch at one end which inhibits movement of the first one of said at least two pins in at least one direction along the axis due to the smaller first hole in the second plate being smaller than a dimension of the catch. In certain aspects the bend is approximately a 90 degree angle. In certain aspects the fixed support is a beam.

In other aspects a chair is provided with a metal frame having first and second pieces, the first and second pieces each including three portions, the first and second pieces spaced apart and the three portions comprised of a securing portion, a back support portion and a seat support portion, the three portions made together from a single flat plate. A backrest is connected between the two back support portions of the first and second pieces. A seat is connected between the two seat support portions of the first and second pieces. The backrest and seat are supported entirely by the securing portions via the back and seat support portions of the first and second pieces such that the chair is cantilevered from a first support secured to the securing portions.

In certain aspects securing portions of the first and second pieces are each affixed to one of a plurality of connector elements and the connector element is configured to secure to a beam mounted to the first support. In certain aspects the first support is a beam. In other aspects a pivot element is connected to each said seat support portion and said seat connected to and configured to rotate about said pivot element between occupied and unoccupied positions. In other aspects at least two pins extend from said seat and interacting with said pivot. The pivot is comprised of a plate having at least two holes, a first one of said at least two holes receives a first one of said at least two pins therein at an axis and allows the first pin to rotate in the first hole about the axis. A second one of said at least two holes is slot shaped such that when said first pin rotates in the first hole, the second pin moves along the slot. In certain aspects a first one of the two plates is an inner plate, a second one of the two plates being a middle plate located between the inner plate and the seat support portion. The slot of the middle plate has a second slot which holds the bumper therein at one end of the slot. The slot of the inner plate is configured to inhibit removal of the bumper from the middle plate along the direction.

In certain aspects the connector element is stamped and includes a raised protrusion which extends from a face of the connector element which faces the securing portion and inserts into a void in the securing portion. In other aspects the single flat plate is stamped and bent wherein at least part of the leg portion includes a stamping therein which creates a raised portion of said single plate relative to an adjacent portion. In other aspects a bend is in said single plate between said leg portion and said securing portion such that said securing portion and said leg portion are transverse to each other first support is a fixed support.

In certain aspects method is provided for manufacturing a plurality of chairs including one or more steps of: providing a plurality of frame pieces, each frame piece cut from one or more flat plates utilizing a two dimensional cutting pattern such that at least two of the plurality of frame pieces were cut from one flat plate, each frame piece comprising three portions which are a securing portion, a back support portion and a seat support portion; providing a plurality of backrests and connecting each backrest between the two back supports of two of the plurality of frame pieces; providing a plurality of seats and connecting each seat between the two seat support portions of the two of the plurality of frame pieces; the backrest and seat supported entirely by the securing portions and through the back and seat support portions such that each chair is configured to be cantilevered from a first support secured to the securing portions of the chair.

In certain aspects the method includes providing a connector part which has been fed, cut and drilled from an extrusion to create the connector part, the connector part has a face transverse to a face of the securing portion; and securing said connector part to said securing portion, said connector part securing to said first support between the first support and the securing portion. In other aspects said plurality of frame pieces are provided with a bend between the securing portion and the leg support portion. In certain aspects said securing portion has one or more holes therein and a connector part is secured through the one or more holes to the securing portion, the connector part including a face transverse to a face of the securing portion through which the one or more holes pass. In other aspects a removable connection allows for separation of the chair from the first support by loosening fewer than six fasteners. In further aspects a removable connection allows for separation from the first support by loosening four or fewer fasteners. In still other aspects separation following loosening requires one or more of a sliding and a rotating movement of the frame pieces corresponding to each chair.

Other objects of the invention and its particular features and advantages will become more apparent from consideration of the following drawings and accompanying detailed description and appended claims.

BRIEF DESCRIPTION OF THE DRAWINGS

FIGS. 17-19 show perspective and top views of the beam system according to FIG. 1 installed on a curved riser.

FIG. 25A-C are two perspective views and a side view of one tilt mechanism which can be used in the chair of FIG. 1.

FIG. 26 shows a perspective view of the seat of the chair of FIG. 1.

FIGS. 27-34 shows perspective views of the tilt mechanism which can be used in the chair of FIG. 1.

FIG. 35 shows a perspective view of an alternate construction of the chair frame FIG. 36 shows a detail perspective view of part of FIG. 35

FIG. 37 shows a perspective view of one part of FIG. 35.

FIG. 38 shows a top view of FIG. 37.

FIGS. 39-41 show a front perspective, top view and side perspective view of an alternate part for the chair of FIG. 35.

FIGS. 42-43 show side views of alternate beam extrusions and mounting systems according to the present invention.

FIGS. 50-52 show side, and two perspective views of components of the chair's tilt bracket.

DETAILED DESCRIPTION OF THE INVENTION

Figure 1:
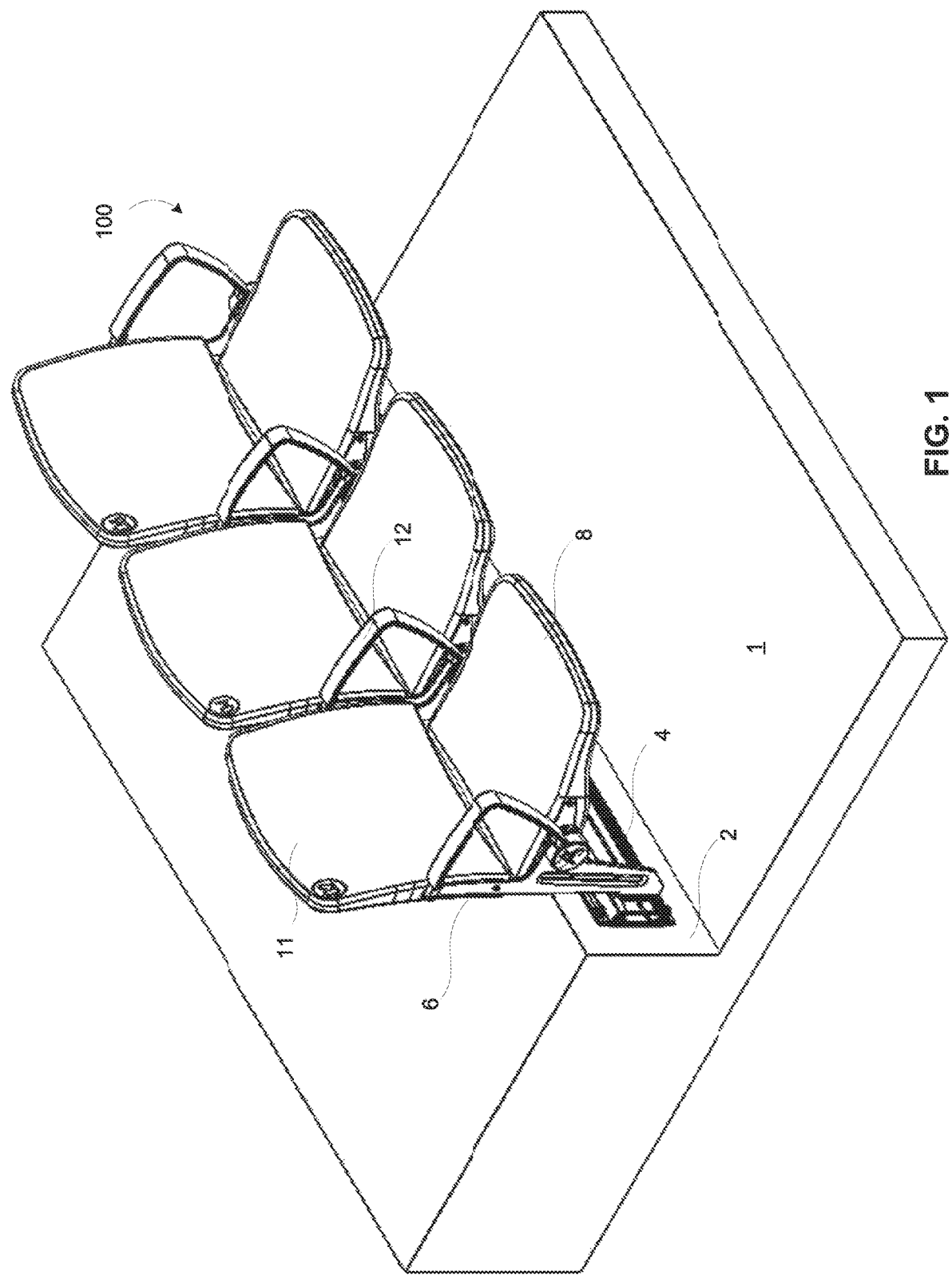
FIG. 1 is perspective view of three chairs mounted on the beam seating system according to the present invention.

Referring now to the drawings, wherein like reference numerals designate corresponding structure throughout the views. The following examples are presented to further illustrate and explain the present invention and should not be taken as limiting in any regard.

FIGS. 1, 1A-C and 2 show the beam system 100 with riser 2 having the beam 4 secured thereto. The run section 1 of the riser structure is shown longer than a typical installation as the next row riser would be placed relatively close to the front of the seat bottom 8, while providing adequate room for users to move in and out of the rows or as necessary for relevant building codes. As shown, the chair includes support 6 which is secured to the beam 4 and provides support for the backrest 11 and the seat bottom 8. Arms 12 are also provided, typically with one end chair (left most chair in the drawing) having two arms with the remaining chairs having only one side with an arm. However, chairs with two arms each can be provided as well.

The beam 4 as shown has its rear face substantially in contact along the entire direction of the beam (or optionally with a small spacer between the beam and the riser). It is understood that slight variations/imperfections in the concrete can cause lack of contact along certain locations along the beam length, but generally, the beam is designed to mount flush to the riser (with a small spacer, typically non-metallic). In general, it is preferred that at least 25%, more preferably at least 40%, even more preferably at least 60%, even more preferably at least 80% and most preferably the entire length of the beam has contact with the riser (or if mounted on the floor, the run) with only small spaces between to inhibit corrosion or provide for leveling adjustments due to imperfections in the concrete surface. In preferred embodiments one spacer is a non-metallic material bonded to the rear of the beam, for example, electrical tape.

More preferably, this contact is on the top and bottom portions of the beam (with longitudinal spacers), and in some situations, there is a gap between the concrete and beam between the top and bottom portions, but generally the length of the beam is in contact with the support (via the spacers). This allows the beam to avoid twisting and making noise. Particularly, most available beam seating systems have the beam suspended from supports which attach to the floor or concrete riser. These supports are spaced and this means that between the supports, the beam is more apt to twist when e.g. someone sits on a seat attached to the beam between supports. This twisting can cause someone sitting down and standing up to cause other adjacent seats to also move and twist due to the seats being connected by a common beam. With the contact of the rear face as described, the beam is less apt to twisting and provides a more secure attachment to the support. Further, the suspended beam portion of existing systems when hit will vibrate and cause noise somewhat like a tuning fork would in that metal vibrating tends to make a sound. The contact with the rear face of the beam to the support inhibits or eliminates this noise/vibration. The rear face of the beam which is closest to the riser or first support is provided very close in a way that the rear face is more or less inaccessible to clamping from a connector which secures to a support item such as a chair. As such, the beam protrudes away from the rear face to provide appropriate surfaces to hang and clamp support items such as a chair to the beam. This hanging/clamping to the beam is done without interaction with the rear face (which is the rear most face of the beam) and while the a connector may secure to a rear facing face of the beam, still, the rear face which is mounted close to the riser/first support is not the face to which the connector secures/clamps to.

Figure 1A:
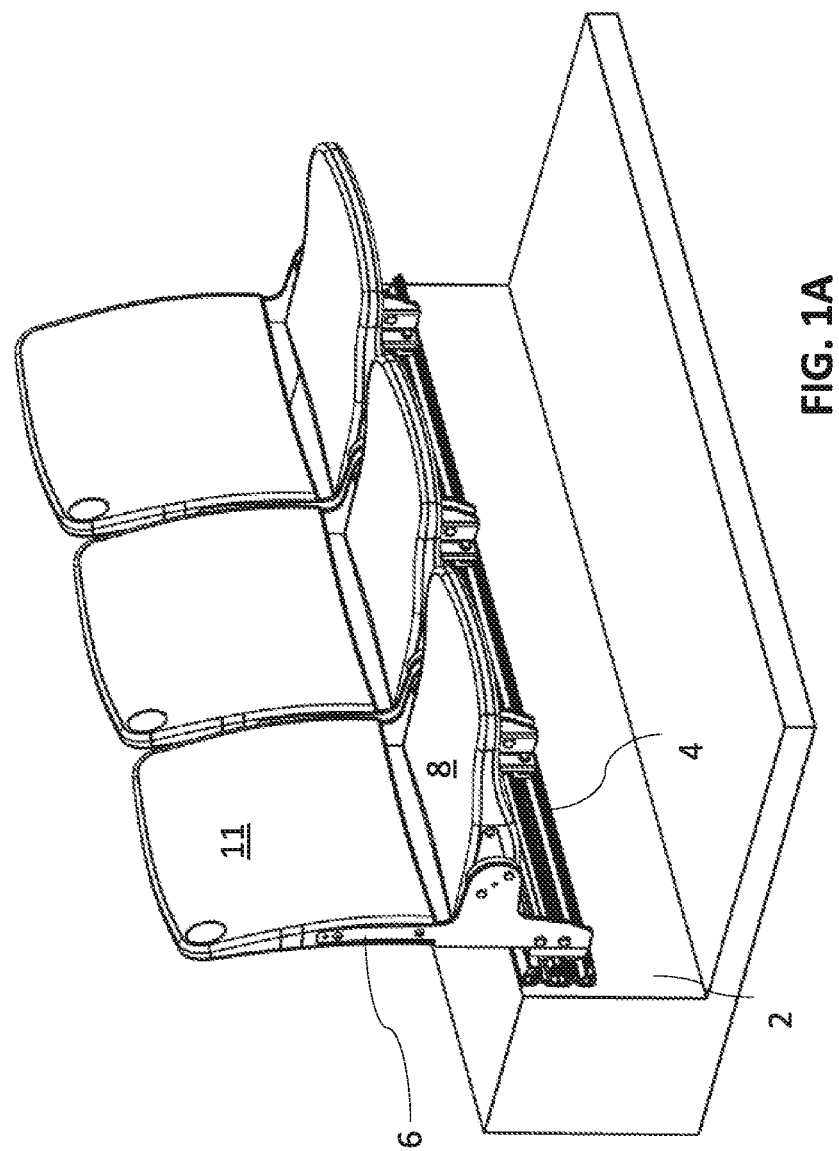
FIG. 1A-C are perspective views of a beam system similar to FIG. 1 with different chair, table and railing variants mounted to the beam.
Figure 1B:
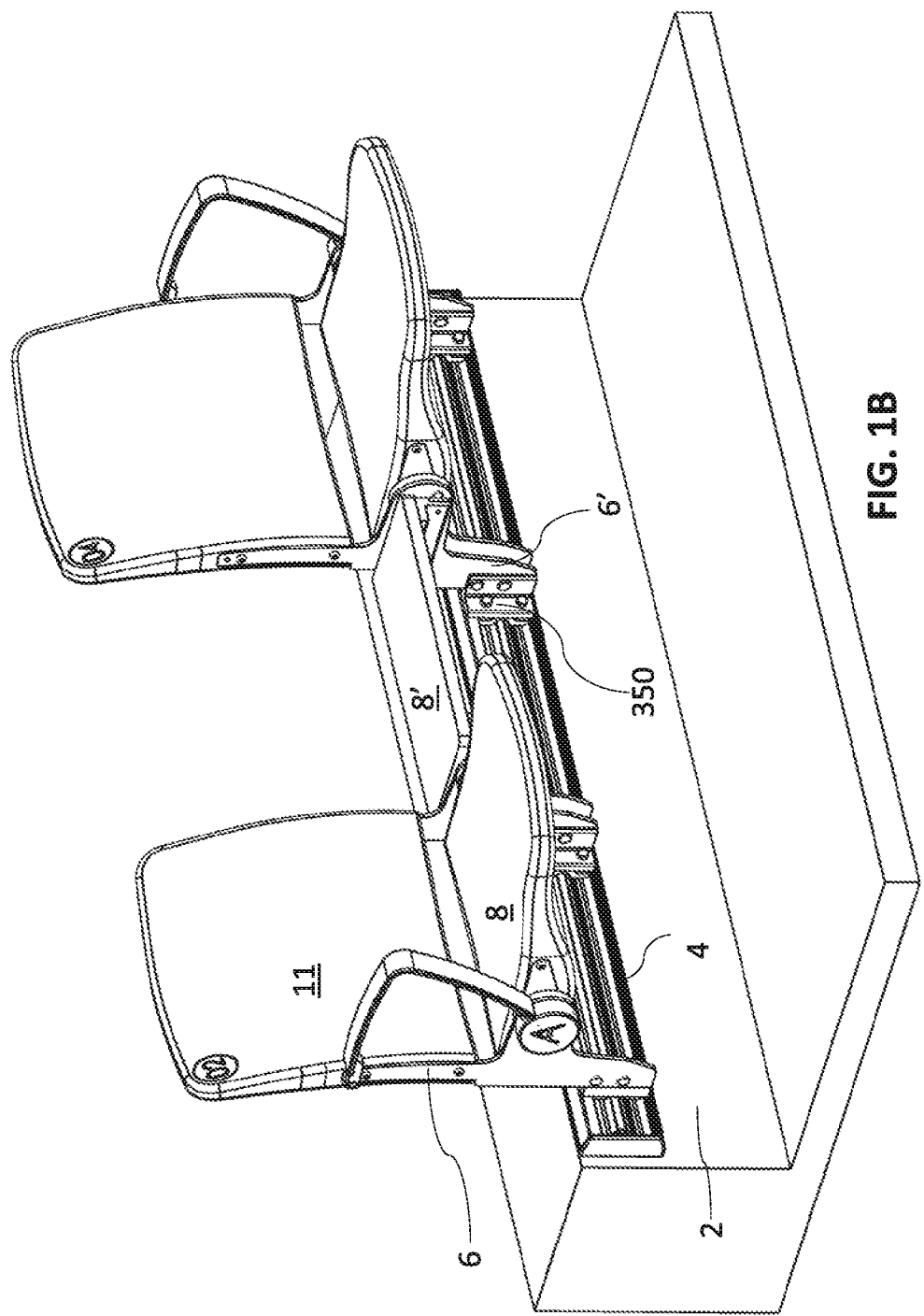
Figure 1C:
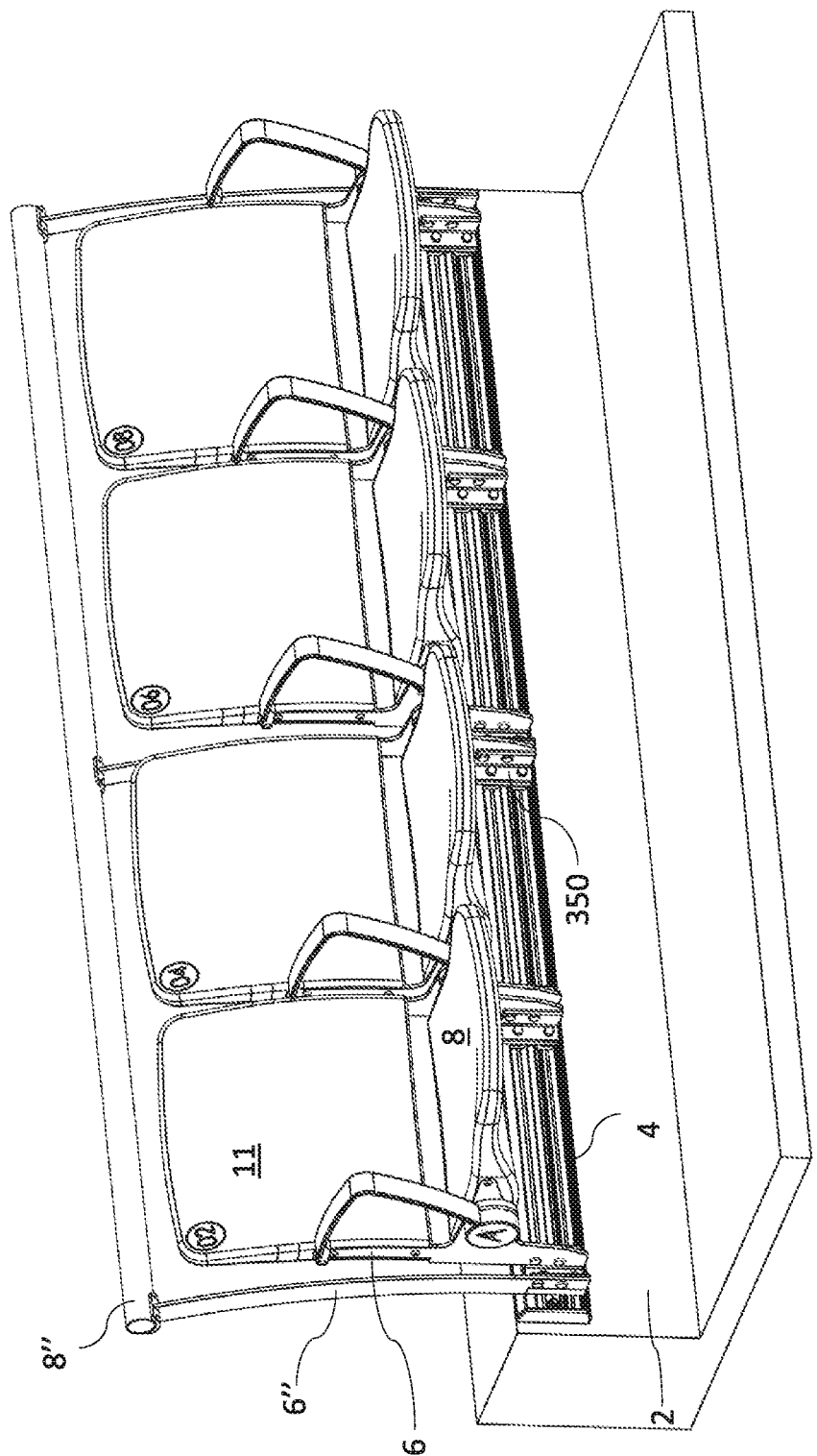
Figure 2:
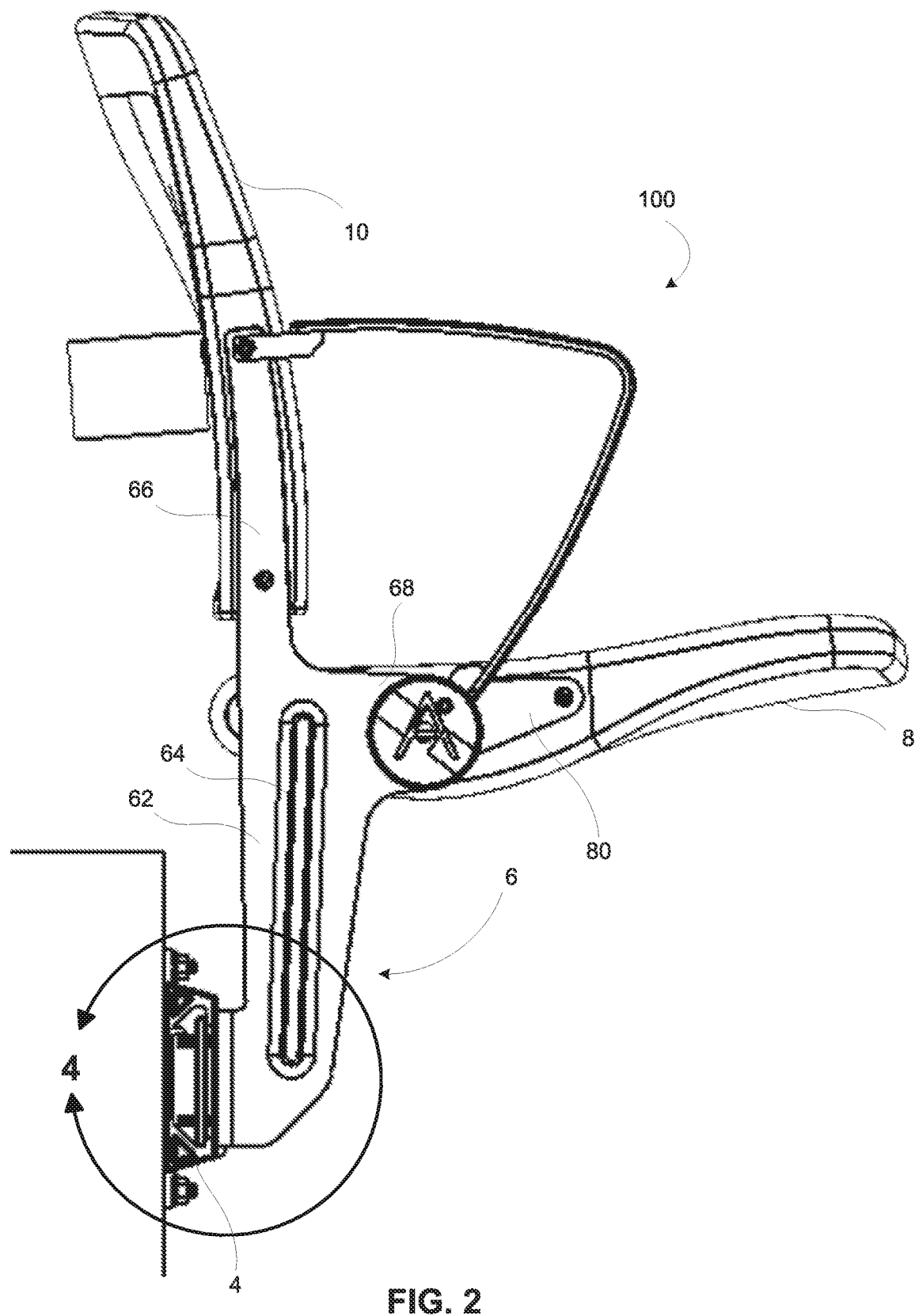
FIG. 2 is a side view of FIG. 1.
Figure 46A:
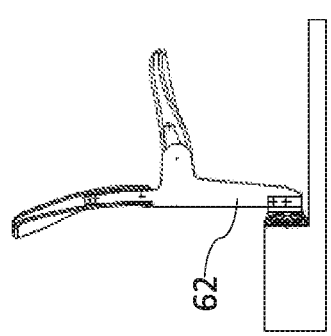
FIG. 46A-C show the beam system mounted on a variety of riser heights.

Further, contact between the beam and the support tends to mean that the beam takes up less space which in turn allows the space in the stadium when the seats are removed to be more useful as the beam is not hanging out a large distance from the riser. In this manner, TV cameras or announcer boxes or other features other than stadium seats have more space which allows the stadium to have greater flexibility. It is understood that the thin rubber or plastic or other backing/shim/spacer sandwiched between the beam and support which would be considered equivalent to the beam being in contact with the support. FIG. 1A-C shows a beam 4 which utilizes a similar channel to that of FIG. 1, but utilizes a single center anchor mounting inside the channel rather than two anchors mounted outside the channel. By providing for a single anchor mounting (i.e. multiple single anchors spaced rather than pairs spaced longitudinally), the process of attaching the beam to the concrete is significantly faster and less expensive and the beam can fit into smaller riser spaces (FIG. 46A).

Typical anchor mounting will involve drilling a hole in the concrete riser, preferably using the beam as a template to locate the holes. Then expansion bolts are placed in and expanded or a threaded rod is inserted with epoxy in the hole. Further benefits of the present system and the provided notch or groove 19 allows for holes to be drilled on site as necessary. Importantly, the beam will need to secure to the concrete without interfering with other features in the riser. The anchors also cannot go too close to the end of a riser section, cannot drill into an expansion joint in the stadium and if there is a crack in the concrete where a hole is supposed to go, the hole cannot be drilled and must be located in a different place. Thus, when drilling for the anchors, locations where the existing and provided holes in the beam do not line up in acceptable locations can be determined and a hole in the beam can be made where the adjusted hole should go with a hole in the concrete following. While other systems may provide separate supports which secure to the concrete and then that the beam secures to the supports, a location where holes cannot be drilled could prove problematic in that the beam is provided with different and potentially much longer than designed lengths between supports which could cause twisting due to the beam being located relatively far away from the concrete riser in comparison to the present system.

As shown in FIG. 17, the riser system may also be curved, this is especially common in corners and/or ends of stadiums. Because the beam projects a small distance from the riser and also has the open front channel, it tends to have a smaller moment of inertia (as used in a bending calculation) such that the beam is able to bend along its longitudinal direction with relative ease as compared to other prior art beams. For example, prior art beams are often of a square tube cross section or other closed but hollow cross section. This means that in order to bend these prior art beams, hydraulic or electric bending presses or roll benders are required in order to fit the mounting system on curved rows. Alternately, many small pieces of beams can be used along the curve, but this significantly increase installation costs and limits the flexibility of the seating arrangements available in those section. However, the present beam can be bent by use of the concrete anchors and human developed force. For example, the beam can be drilled with mounting holes first and then one concrete anchor is aligned and secured at one end of the beam. Next, the location of the next concrete anchor is determined and drilled in the concrete and the beam is pressed towards that anchor. Since the radius of the first support (riser) is relatively large (shallow curve), the nut for the anchor can be threaded easily or with a little bit of pressure from the installer. The anchor is then tightened and the process of tightening the anchor bends the beam into place such that the rear face of the beam contacts the riser. Once secured to the riser, the beam is unlikely to bend further as it is supported by a large concrete structure. Since the beam is relatively tall as compared to its projection, this provides vertical resistance to bending between the anchors which is sufficient to support the chairs and the weight of people sitting in the chairs. Thus, by the beam being in contact with the support and the rear face of the beam generally not being accessible for securing chairs to the beam, the beam can take up less space, be bent to match curved risers and can avoid vibration and twisting once chairs are installed.

The beam 2 in particular embodiments is of a height (measured vertically in FIG. 6) which is at least three times the depth (measured horizontally in FIG. 6) and includes the open channel in the front face which opening at the front of the beam extends generally at least 30% of the height, with the opening measured between the front most obstructions of the channel, 32 and 26. More particularly the height is at least four or even more particularly at least five the depth and more particularly the opening is at least 40% or more particularly 50% or more even more particularly at least 60% of the height.

Figure 10:
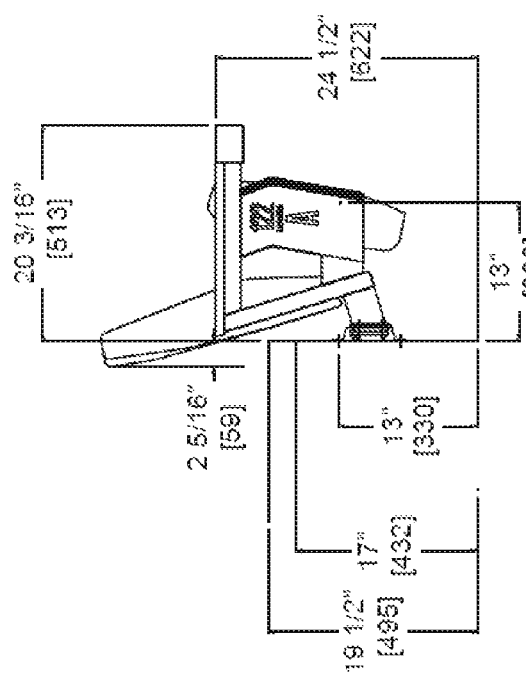
Figure 12:
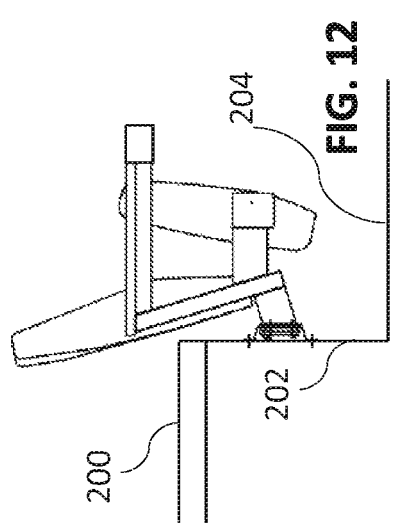

FIG. 1A shows an armless chair mounted to the beam. FIG. 1B shows FIG. 1A but with one of the chairs replaced for a table 8'. FIG. 10 shows another support item which can attach to the beam, namely a railing 8" which includes rail support 6". As shown in FIG. 3A and FIG. 10, the chairs and railings (and table) all utilize the same support bracket or connector part 350 which in the shown embodiments is riveted to the various supports. The railing support 6" is provided from flat cut plate similar to the chair which provides significant flexibility in railing design and securing. Further, as seen in FIG. 3A, the bracket 350 is located between two adjacent chairs, thus allowing the railing and the chairs to all mount to the same beam at the same time.

Figure 3:
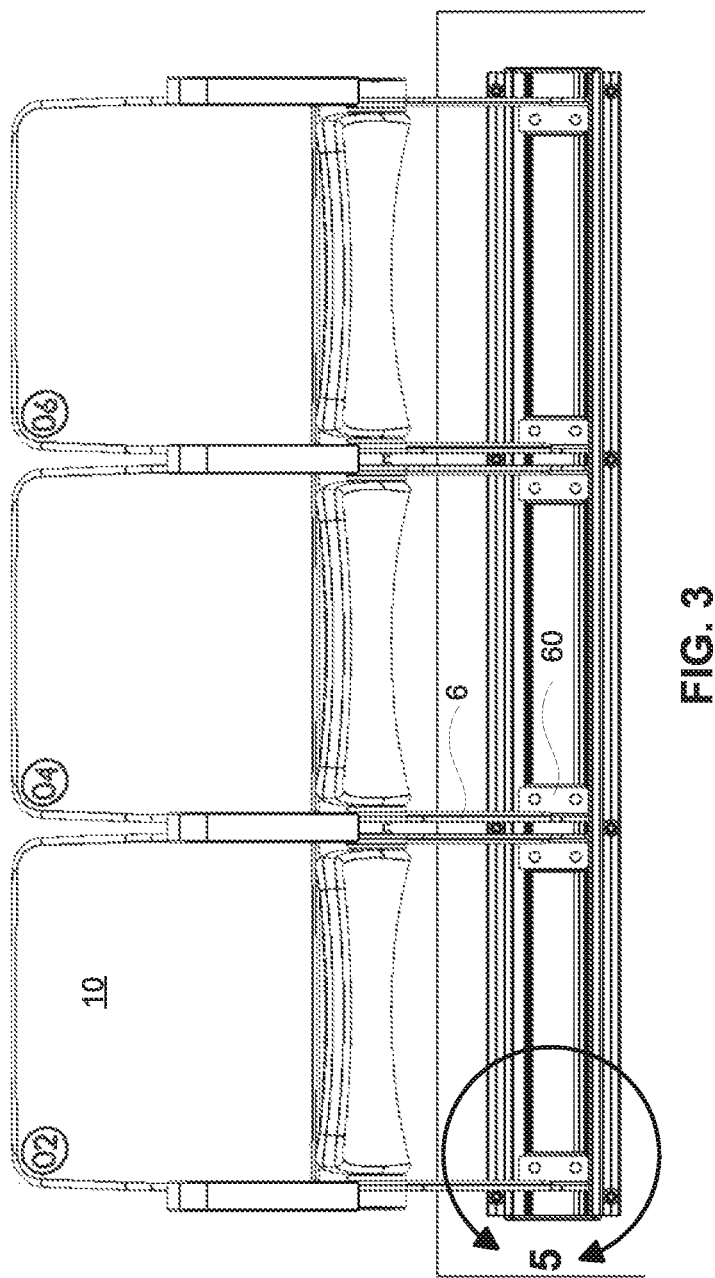
FIG. 3 is a front view of FIG. 1
Figure 3A:
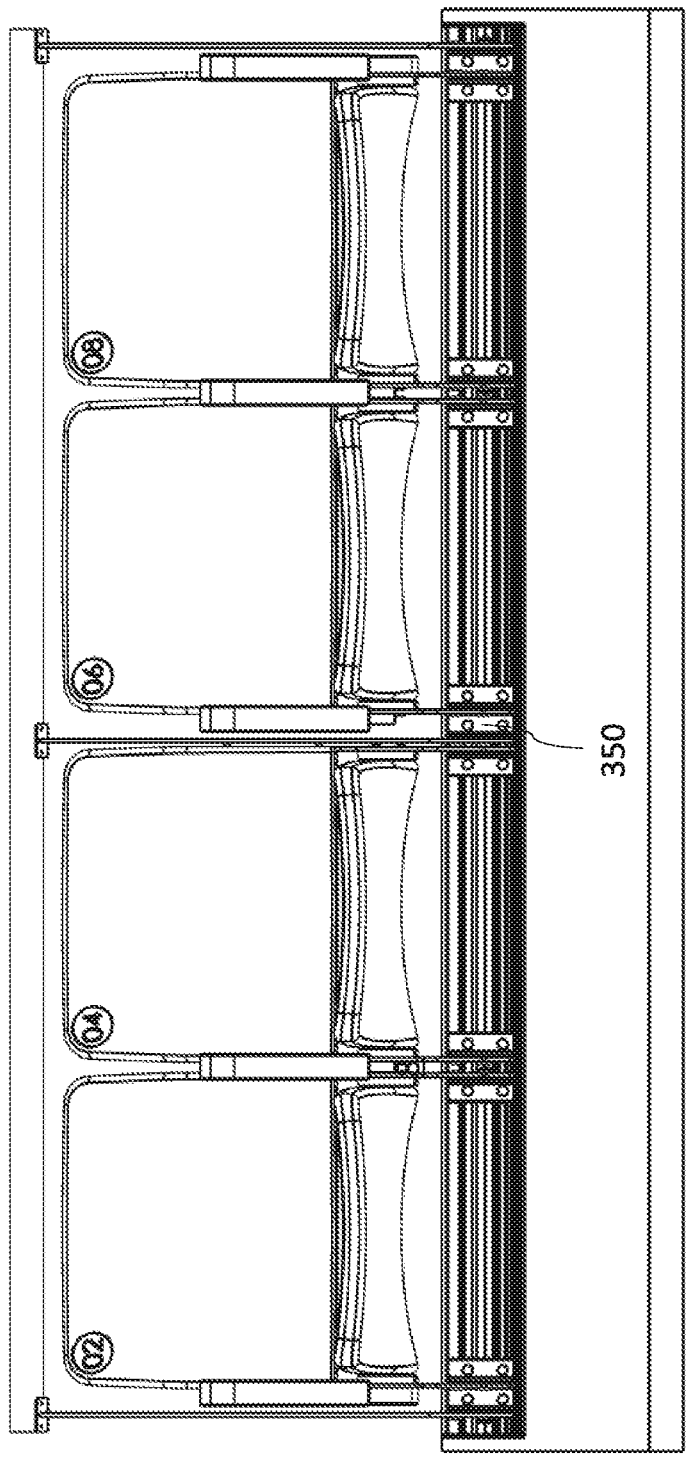
FIG. 3A is a front view of FIG. 1C

As can be seen in FIG. 3, the support 6 includes plate 60 or securing portion which is formed by bending the support. It is this plate 60 which assists in securing to the beam.

Figure 5:
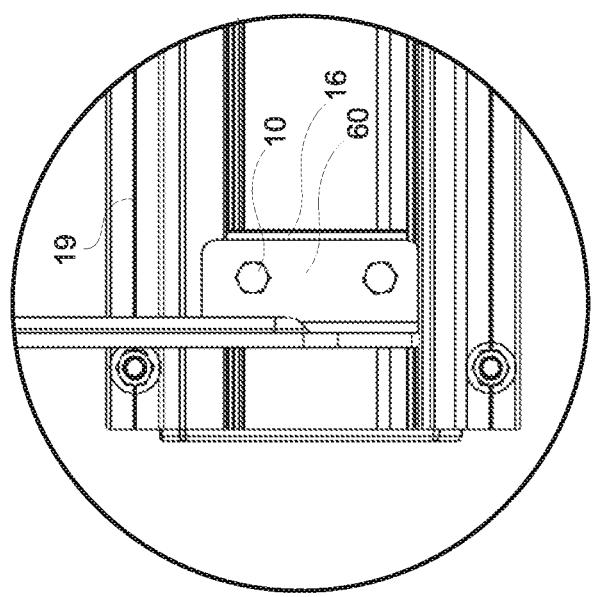
FIG. 5 is a detail view of FIG. 3
Figure 4:
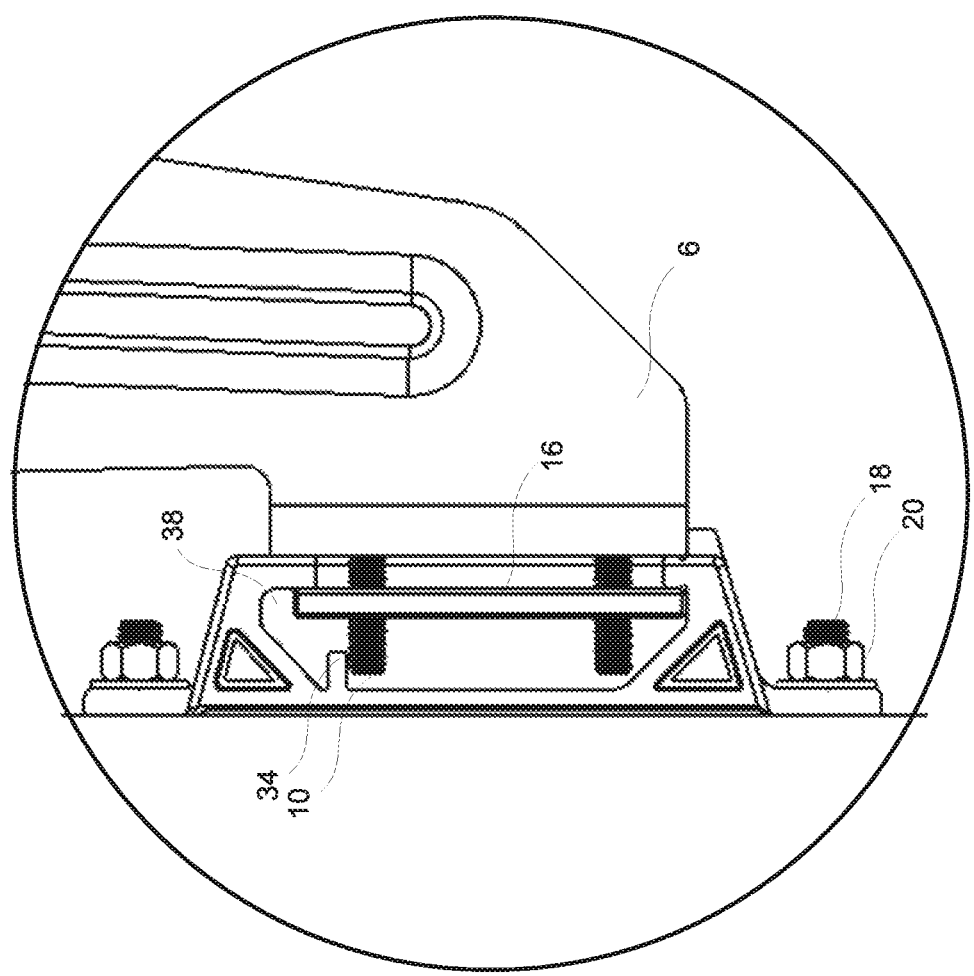
FIG. 4 is a detail view of FIG. 2

Referring to FIGS. 4 and 5, the plate 60 has bolts 10 there through which secure to connector 16 which includes two threaded holes. In this example, the connector 16 is a flat plate, but other shapes can be utilized. The beam is secured to the riser 2 with threaded anchors 18 and nuts 20. These anchors 18 are typically commercially available concrete anchors as the riser 2 is typically made from concrete. However, the riser may be made of another material and other conventional fasteners appropriate for securing the beam to the riser may be used. The beam may be initially provided without holes for the anchors 18 and instead a notch 19 is provided generally running along the length of the beam both for the top and bottom bolts. The beam can then be cut for the particular row length on site and the idea anchor location can be determined. Once determined, the beam can be drilled and notch 19 will help the installer locate the drill bit at the correct location vertically with the lateral location at the discretion of the installer (or architect/engineer/manager as appropriate).

Figure 6:
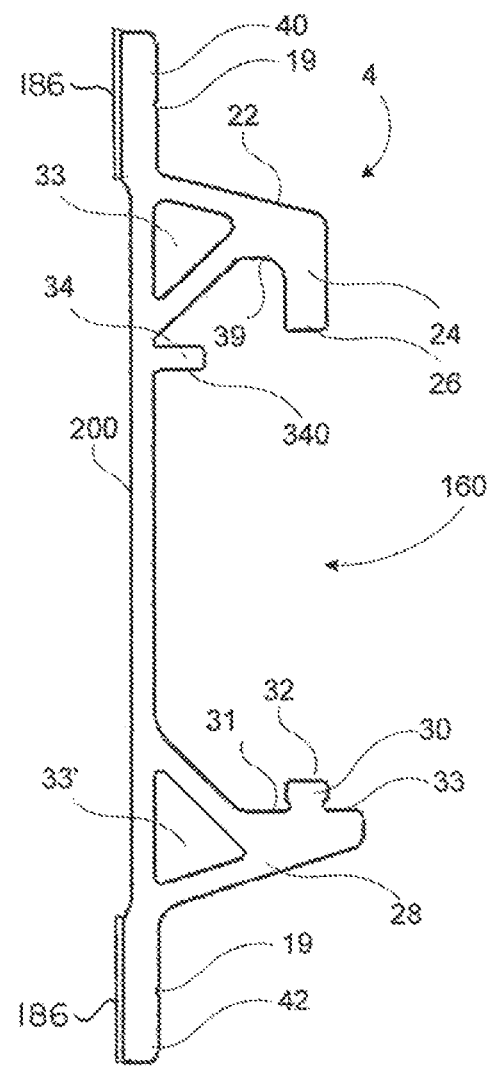
FIG. 6 is a side view of the beam in FIG. 1 and FIGS. 6A and 6B are side views of different beams which can be sued in FIG. 1A-C.

The channel 160 of the beam as shown in FIG. 6 has a number of important features which enable the connector 16 to secure easily to the beam from the front and also allow for easy removal or repositioning of the chair.

The rear face 200 of the beam is mounted facing the riser 2 Upper extension 22 extends adjacent upper tab 40 and this upper tab includes part of the rear face 200 of the beam. Downward (or inward) extending tab 24 extends to end 26 from the upper extension 22. Catch 34 extends from the inner face of the channel 160 and a bottom outward edge 340 is located at a distance above face 31 which is substantially equal the distance from the bottom edge 70 of connector 16 to the top 71 of bolt 10 to allow for vertical movement of the support 6 to be restricted once the bolt 10 is screwed in enough to interact with the catch 34. A second catch (not shown) may be provided to interact with the lower bolt of the two shown in a similar fashion, or the catch may be moved down to interact with the lower bolt. The lower extension 28 extends from lower tab 42 which includes part of the rear face 200 of the beam. This extension 28 also has a upward (or inward) extending tab 30 that extends to end 32 and outer surface 33 is provided to support the lower edge 70 of plate 60 once installation is completed. The distance from end 32 to end 26 is smaller than the distance from end 70 to 72 of the connector 16. In this manner, the connector 16 is retained by tabs 24/30 once the connector is fitted inside the channel 160 of the beam. The distance from end 32 to upper inner end 39 of the interior face of the extension 22 is larger than the distance from end 70 to end 72 of the connector 16. In this manner, the connector 16 can be easily inserted into the channel, but is also retained once located appropriately and fastened. Thus, the tab 30 provides an obstruction for the connector 16 inserting into and exiting the channel in that the obstruction requires the connector to be positioned in a specific manner in order to allow for insertion/removal of the connector 16. In the embodiment shown, the upper and lower extensions include hollow sections 33/33' which provide for weight savings of the beam. FIG. 6 also shows spacer 186 on the rear face of the beam. Preferably, the beam is a metal extrusion, typically aluminum and in this case, it is desirable to separate the metal from the concrete to inhibit/prevent corrosion due to contact with the concrete. Corrosive tendencies between aluminum and concrete are particularly important to avoid and thus spacer 186 will typically be a non-metallic and preferably of an electrically non-conductive material. Vinyl tape (electrical tape) or adhesive backed rubber are examples of suitable materials.

Figure 4A:
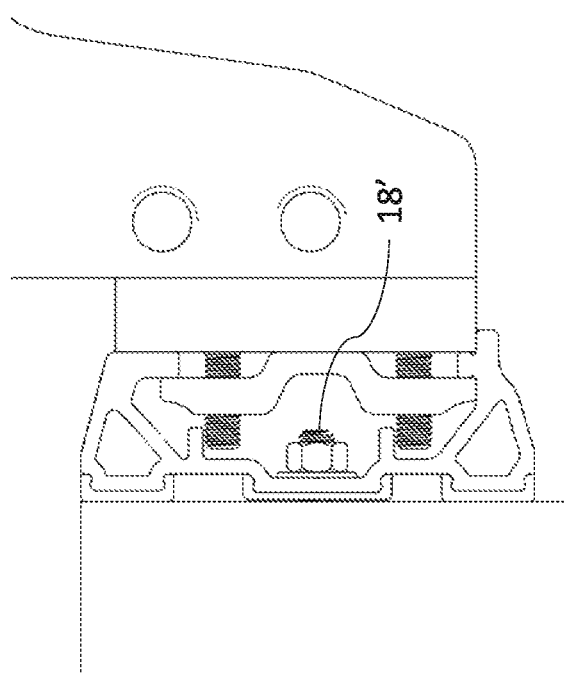
FIG. 4A is a side detail view of FIG. 1A
Figure 6B:
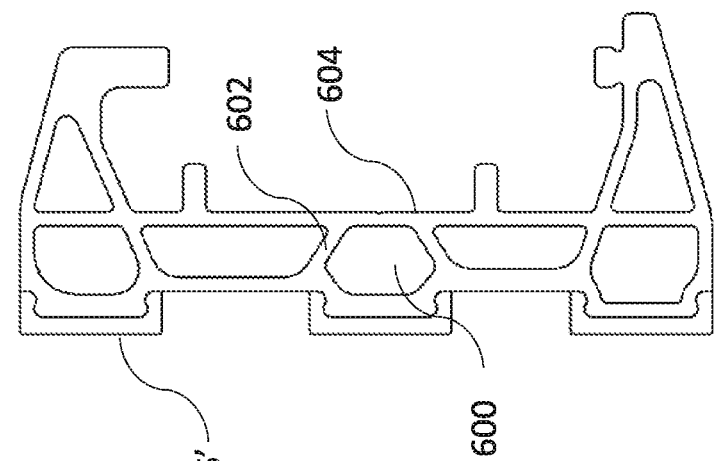
Figure 6A:
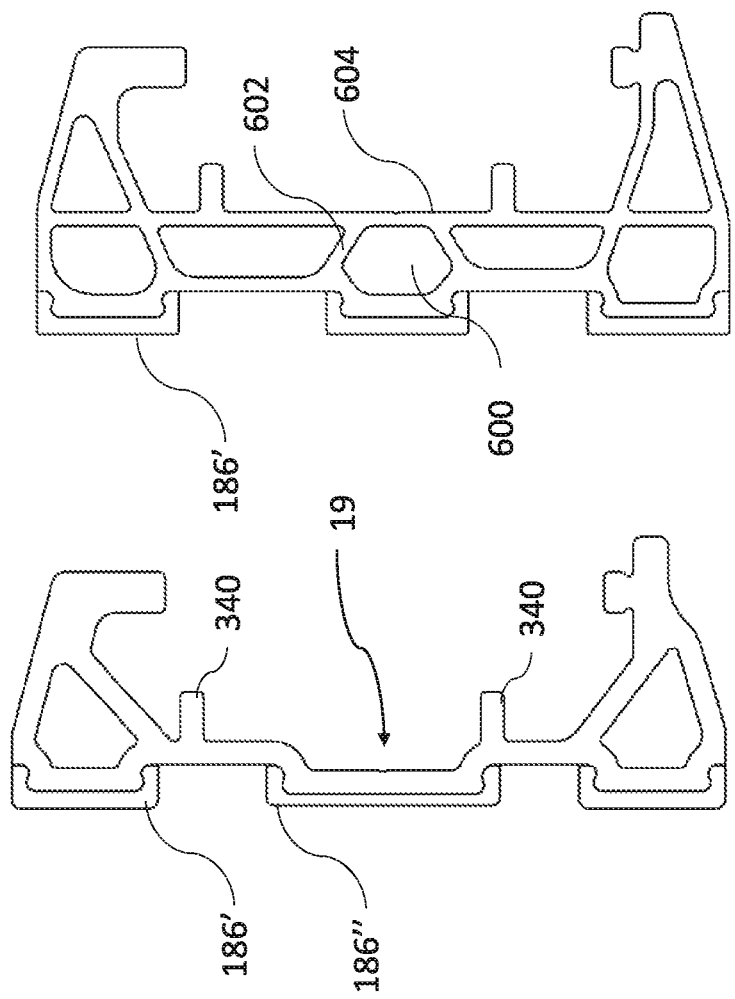

FIG. 6A shows a beam similar to FIG. 6 but with the anchor notch 19 located in the channel (FIG. 4A shows where the anchor 18' goes through the beam, with the center axis of the hole located at the notch). FIG. 6A provides a second catch 340 as compared to FIG. 6A and the tab 40/42 removed with the rear face of the beam modified to accommodate clip on spacers 186'/186". As shown, these spacers have a cavity which clips on to a cooperatively shaped protrusion on the beam's rear face and through interference fit, the spacers will secure to the beam. Spacer 186" is optionally provided with a center drilled hole located where the anchor will pass through. Typically these spacers 186'/186" are roughly 0.5-5 inches wide or more particularly 1-2 inches wide, but longer or narrower widths are contemplated. FIG. 6B shows the beam similar to FIG. 6A but with the spacers 186' being used in three locations and additional hollow sections 600 with ribs between the inner channel face 604 and the rear beam face. As shown, there are 5 hollow sections with two pairs being mirror images of each other. It is understood that the hole in the beam would still go through the notch shown between the catches but would go through both the channel face 604 and the rear face of the beam and the spacer shown in the center of the beam. The added ribs 602 and hollow sections 600 are located between the channel and the rear face of the beam and provide for added torsional and bending rigidity which in turn allows the chairs and other support items to vibrate less and be more sturdy when subjected to loads. In the embodiment shown in FIG. 6b, certain of the ribs align between the channel and rear face align with ribs which in part define the channel and define the upper and lower extensions to which the connector 16/16' secures to. In addition, the hollow sections 600 can be used to feed cables through the beam, for example, electrical or signal cables and methods of installing the system may include feeding electrical and/or signal cables through one or more of the hollow sections 600.

Figure 7:
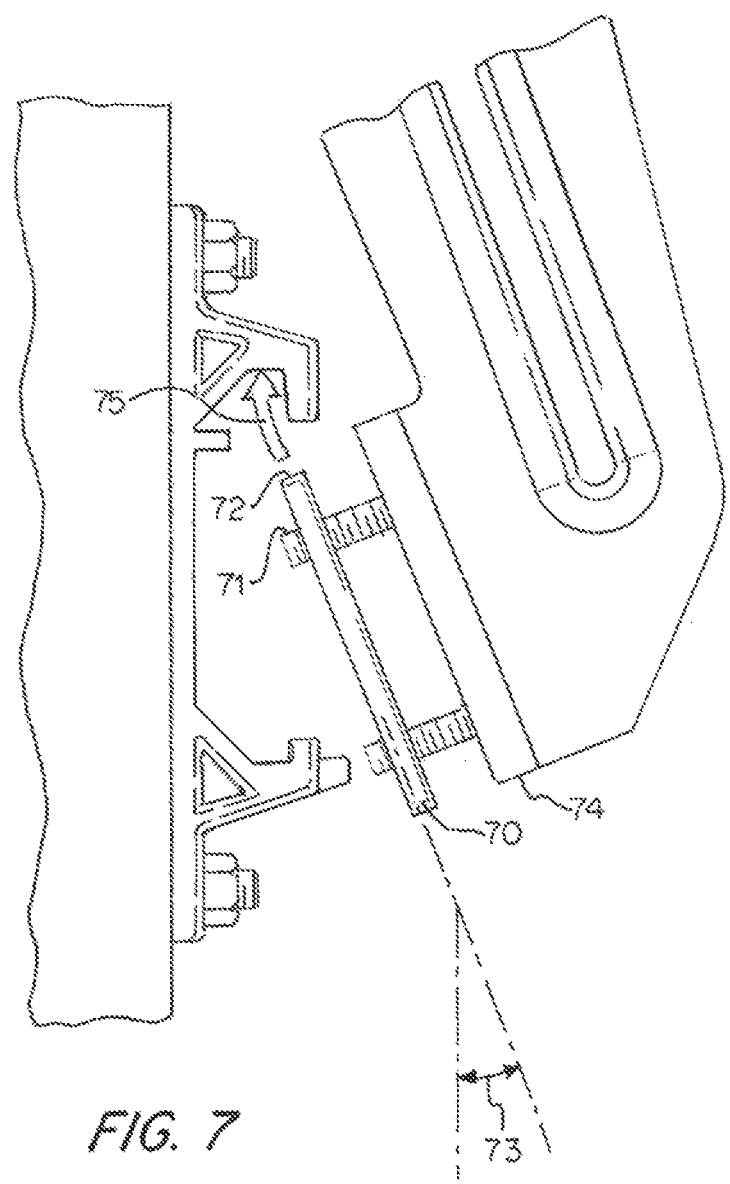
FIGS. 7-9 are side views of the beam system of FIG. 1 showing the process of securing the chairs to the beam.
Figure 8:
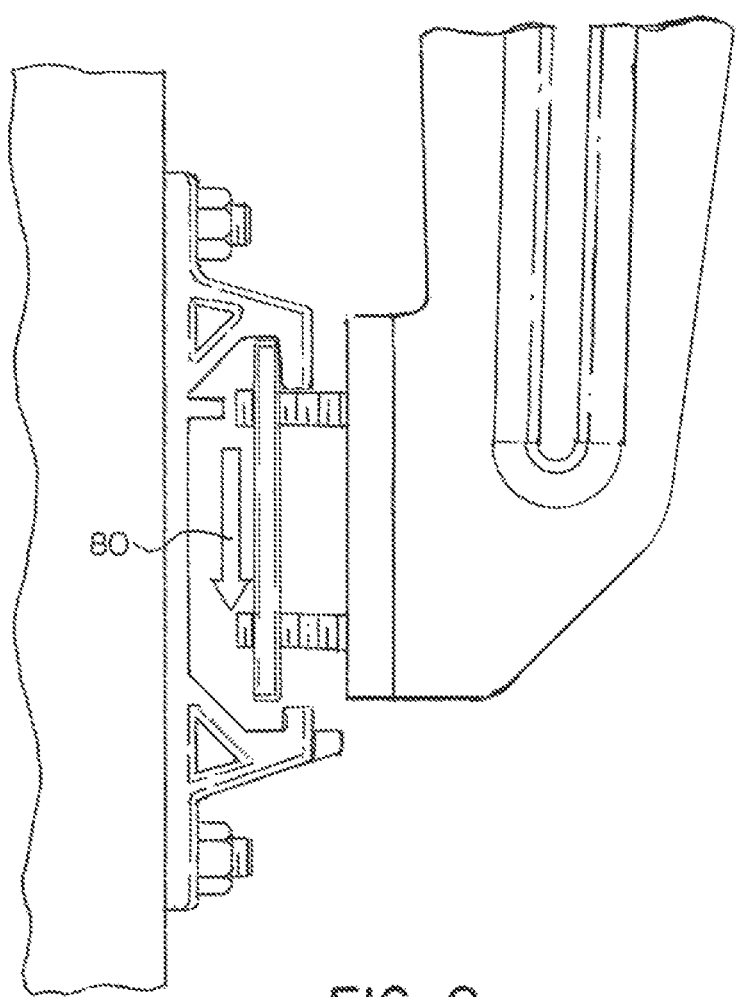
Figure 9:
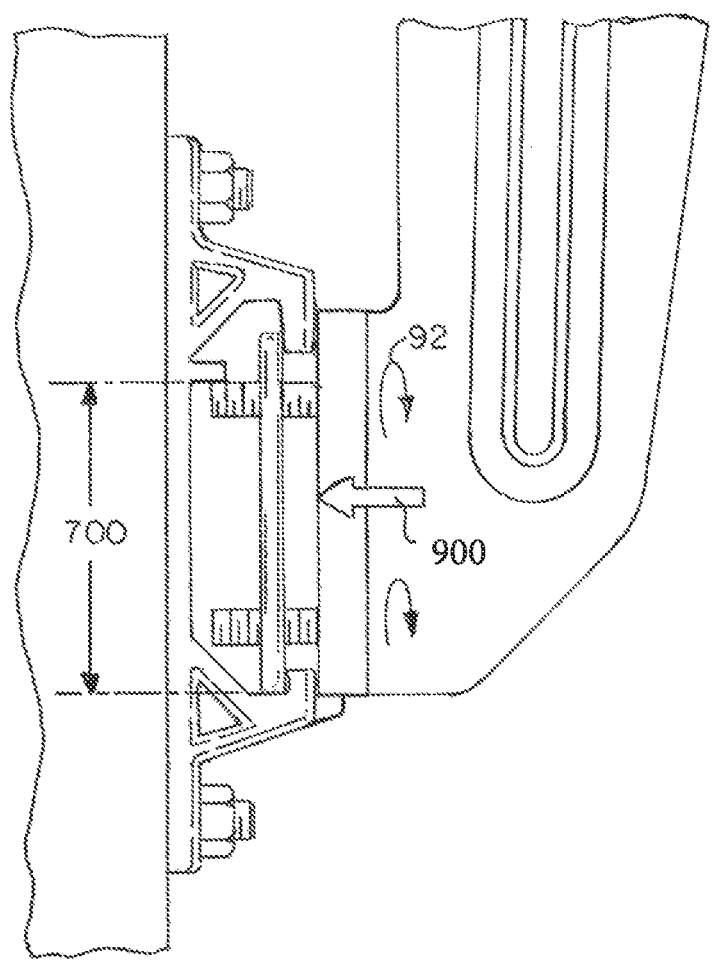

FIGS. 7-9 show how the connector 16 is inserted into the beam. In FIG. 7, the connector is positioned at angle 73 and inserted 75 such that end 72 goes fills space 38 or preferably contacts inner end 39. The connector is then tilted/rotated (clockwise in the view shown) to be at a second angle (shown generally vertical—See FIG. 8). Then, once generally vertical, end 70 has passed over end 32 and the connector can be slid downwardly 80 as shown in FIG. 8 so that end 70 contacts face 31. Further, end 74 of the plate 60 contacts face 33 and is supported thereby.

As shown in FIG. 9, the bolts are tightened 92, pressing 900 the plate 60 against the beam, specifically the outer faces of tabs 24/30. The result is that the bolts clamp the tabs 24/30 between the connector 16 and plate 60 while the bottom faces both inner 31 and outer 30 faces which are in/adjacent the channel 160 support the bottom of the plate 60 to inhibit downward movement of the chair. Vertical movement is inhibited by interaction of the bolts with catch 340 to prevent the connector 16 and specifically its upper edge 72 from sliding up into space 38 and thus allowing the bottom edge 70 of the connector to be removed. In certain embodiments, the catch 340 may be longer than shown, thus requiring a significant portion of the bolt to be un-threaded to allow for removal of the seat out the front of the beam. In this manner, chairs can be secured to the beam at any position along the beam without interference from any structure which supports the beam and the interface between the beam and the chairs is very close to the riser 2. Further, with the bolts loosened, the chairs can be slid along the beam to provide for ease of adjustment (left to right from the view of FIG. 3). Further, the anchors which connect the beam to the first support will not interfere with this sliding motion. It is also understood that prior to the bolts being tightened, the connector 16 would be retained in the channel against linear outward movement opposite the direction of arrow 900, but that upward movement of the connector 16 would allow the connector to be removed once the tab/end 30/32 is cleared from interference with the bottom 70 of the connector 16.

Typically, the interface between the chair and beam is less than 5 inches away from the riser, more particularly less than 4 inches, more particularly less than 3 inches and even more particularly less than 2 inches away from the riser 2. The result of this is that the distance from the riser 2 to the seat pivot is fairly small, resulting in less space taken up by the seat when the seat bottom 8 is in the up position, thus saving significant space on a per-row basis as the run per row is typically dependent on how much space is required between the seat when in the closed (or un-occupied) position and the riser in front thereof. Further, the closer the seat pivot to the beam, the smaller the bending moment due created when the chair is occupied. This allows less material to be used to provide adequate support for the chair.

Due to the configuration of the beam in that the beam is secured to the riser through bolts which are outside of the channel, the chair and chair support can be secured at any position along the beam and the manner in which the beam secures to the riser will not interfere with the chair securing to the channel. This enables the beam to be installed and then a variety of seats to be used. For example, a "VIP" configuration seat which may be larger and wider than other seats can be secured to the beam and then replaced with another type of seat, depending on the needs of the stadium/auditorium for the particular event. Seats can also be easily removed as needed without having beams/supports protruding extensively from the riser face in that the beam will only extend a matter of inches out from the riser face.

Furthermore, the support 6 and plate 60 are formed by bending and stamping a metal plate which provides for a more simple manufacturing process which also does not require expensive molds to create a beam securing system. Furthermore, the connector 16 in preferred embodiments is also a metal plate with two threaded holes sized appropriately to fit in the channel 160 in the manner described herein. It is understood that connector 16' could replace connector 16 and function and operate in the same similar manner for purposes of the chair installation process.

Figure 11:
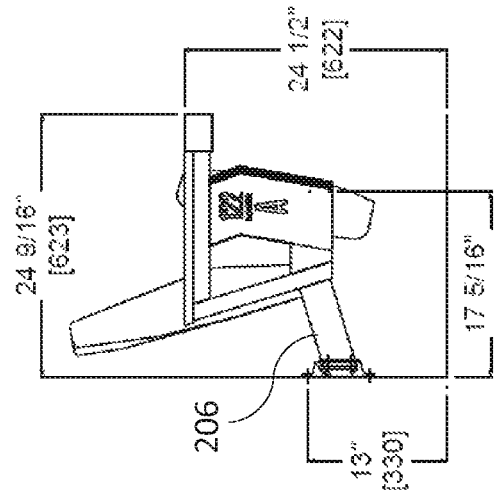
FIGS. 10-13 are side views of alternate chairs secured to the beam system of FIG. 1 and show different riser/wall heights behind the chair.
Figure 13:
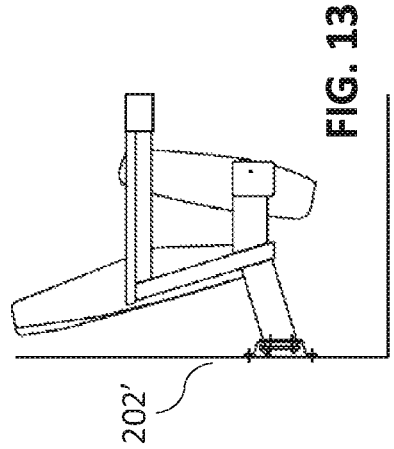
Figure 16:
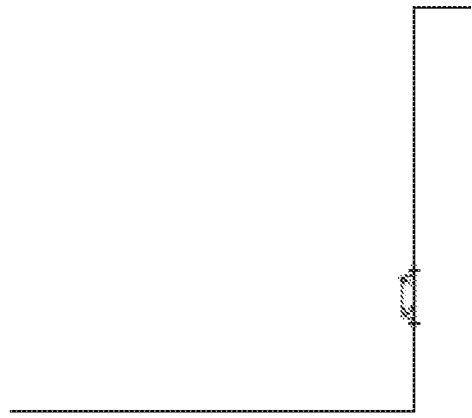
FIGS. 14-16 show a floor mounted beam according to FIG. 1
Figure 15:
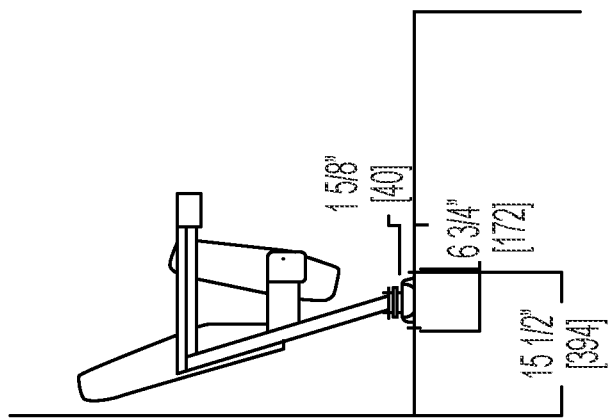
Figure 14:
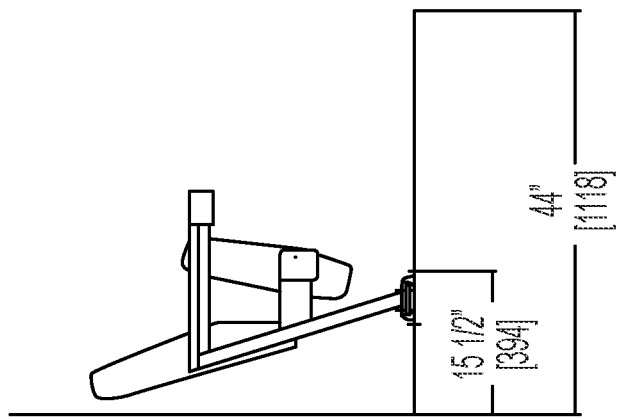

Referring to FIGS. 10-13 the beam system is shown with a different style chair mounted thereto and various dimensions are shown. Particularly, comparing FIGS. 10 to 11 (and 12 to 13), FIGS. 11 and 13 show relatively high vertical wall behind the chair. As a result, the arm 206 which secured between the beam and chair is relatively long as compared to FIGS. 10 and 12 in that the backrest is angled back, thus the longer length of the arm 206 is required for clearance. As this arm is longer, it results in significantly higher stresses on the beam. As a result, it may be desirable in certain instances to place the beam on the floor as shown in FIGS. 14-16, thus reducing the need for the cantilever arm 206 to extend a long length and placing the beam generally under the weight of the user. This system may also be used in auditoriums with straight rows on an floor (angled or flat) in that the chairs could be removed to only leave the beams on the ground to allow for placement of e.g. a false floor on top of the beams to provide for a generally open space if seating is not desired. Due to the small profile of the beam, this increased flexibility is provided for the auditorium to have a variety of flexible seating (and standing room) configurations.

Figure 18:
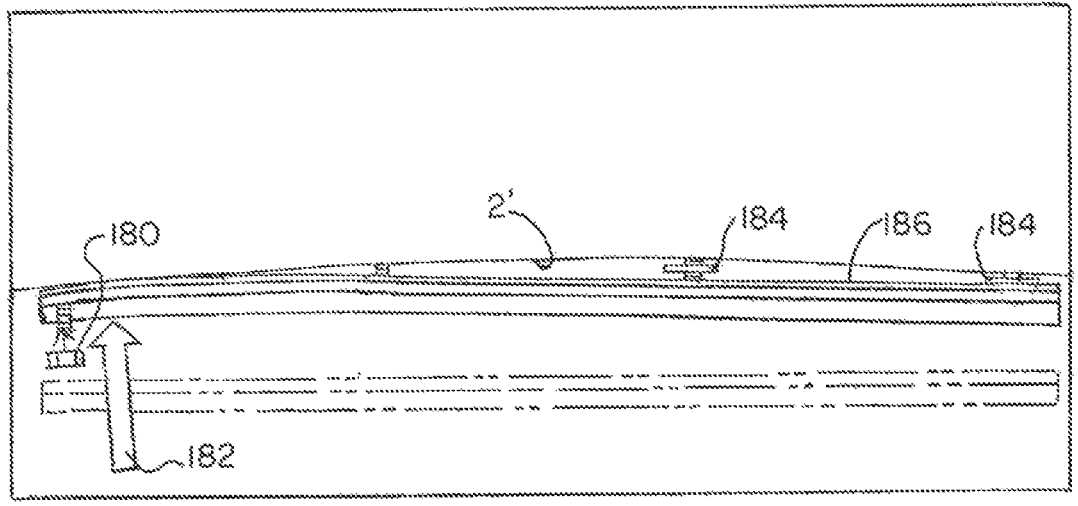
Figure 19:
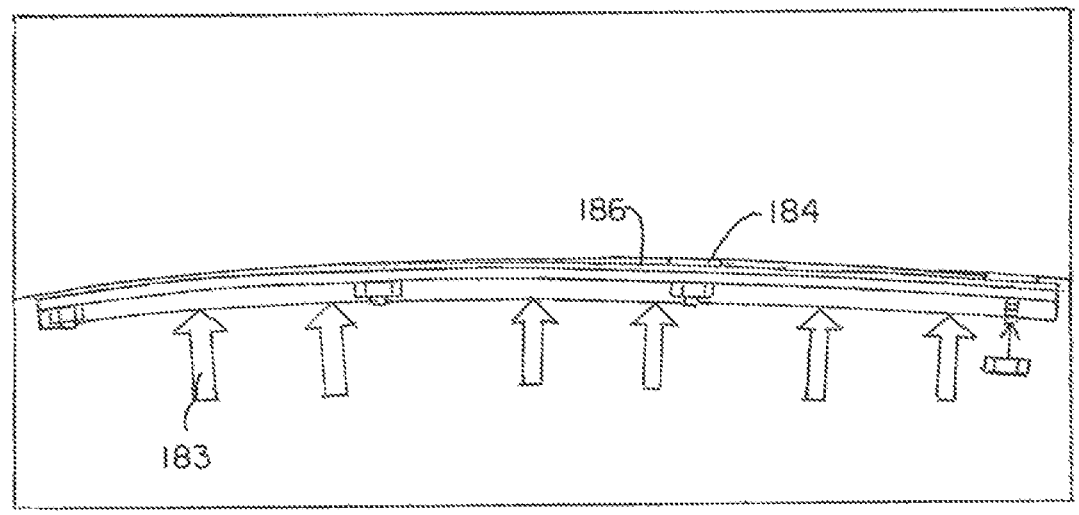

FIG. 17-19 shows the beam being installed on a curved riser 2'. Curved risers are often found in the corners of large stadiums and present a difficult issue for installers of common beam systems. Particularly, many beam systems are relatively stiff in both vertical and horizontal bending, meaning that the curve of the riser would need to be bent into the beam via horizontal bending in order for the beam to fit. Alternately, multiple smaller straight sections of beam would be employed to fit around the curve. In either case, large bending machines would be required or it would be necessary to make more cuts and fits of the beam to fit around the curved riser. However, in the present system, the beam is stiff in the vertical bending direction but generally not as stiff in the horizontal bending direction as shown in FIGS. 17-19. Due to the curve riser 2' having a relatively large radius of curvature, and due to the dimensions of the beam and its ability to bend easily, the beam can easily be bent by the installer without use of large bending tools such as hydraulic or electric presses. Rather, the anchors 18 provide sufficient force to allow the beam to bend to match the riser 2' curve. As shown in FIGS. 18 and 19, typically bolt and nut 180 will be installed on the end of the beam and it will be pressed 182 towards the riser. The beam can be pre-drilled with holes and then the anchors 18 would be located accordingly. With the end bolt 180 on, the beam is progressively pushed 183 onto other anchors 18 going down the length of the beam. This progressively bends the beam until it is secured to the riser in the curved configuration. As the curve is relatively gentle (large radius), the connectors can be inserted as shown in the previous figures without significant problems due to the slightly modified shape of the beam. Typically, the connectors for the seat would be spaced apart slightly more as compared to a straight beam as the end of the seats would tend to be closer together due to the curve of the beam. The beam as shown in FIGS. 17-18 is substantially straight before it is bent to conform to the riser as shown in FIG. 19. While the beam may not be perfectly straight, as it is extruded, it is designed to generally be straight and there can be some imperfections or variances in the beam that make it less than perfectly straight. The bending process from FIG. 18-19 will generally conform the beam to the riser whereas the beam begins the process generally being a straight extrusion within acceptable manufacturing tolerances. This substantially straight beam is contrasted with a beam or pipe which is designed to be curved from the manufacturing process (e.g. a curved extrusion or a straight extrusion placed in a bending/rolling press to pre-bend the beam to curve). As can be seen, spacer 186 is between the beam and the riser 2' and additional spacers 184 may be used as shims to account for variances in the riser 2' geometry, for example, if portions of the riser 2' where the beam is mounted are not perfectly vertical (or at the desired angle). Spacers 184 are shown as a washer, but other geometries can be employed and the spacers 184 do not necessarily need to be secured around the bolts/anchors as shown. It is understood that a similar method of assembly can be used for the non-curved risers 2 but that the described bending would not be necessary or would be less necessary. There may still be some bending employed with straight risers due to variances in the riser surface. The spacers 184/186 are equally applicable for straight and curved risers. As can be seen, the rear face of the beam is designed to be anchored to the riser in close proximity both for curved and straight configurations of the riser. By keeping the riser and rear beam face in close proximity the beam is more able to transfer the stiffness of the riser to the chair such that the twisting or cantilevered bending resistance of the chair does not rely primarily on the ability of the beam to resist torsion. Other prior art beam systems will commonly have "L" shaped mounts to which the beam then sits on top of. The result is that the beam's torsional stiffness becomes the primary way in which the chair cantilever support is accomplished. The result is that the chairs will tend to "vibrate" and that sitting on one chair may twist the beam such that it impacts other chairs. By providing a number of anchors along the length of the beam, this "vibration" or twisting is significantly minimized and can be further minimized by simply adding more anchors. At the same time, chairs (or other support items) can be easily removed and/or repositioned by simply loosening the four bolts that clamp the connector to the beam. Thus, one critical improvement to the present system is that the rear beam face is very close to the riser and in preferred embodiments only spacers to avoid corrosive tendencies of aluminum and concrete contact and any shims needed to adjust for surface level are provided on the rear of the beam. Typically, the spacing between the riser and rear beam face will be less than a thickness of the beam where the anchors pass through the beam. Similar spacing holds true for when the beam is mounted on the floor such that the bottom face of the beam is equally close to the floor. It is understood that the bottom face in the floor mounted configuration would be the same face of the beam as the rear face in the riser mounted configuration.

Figure 21:
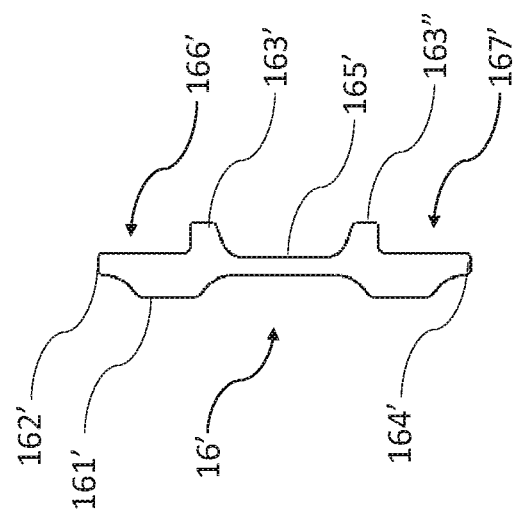
FIGS. 20-21 show side views of the system according to FIG. 1 with an alternate connector piece use and that connector alone.
Figure 20:
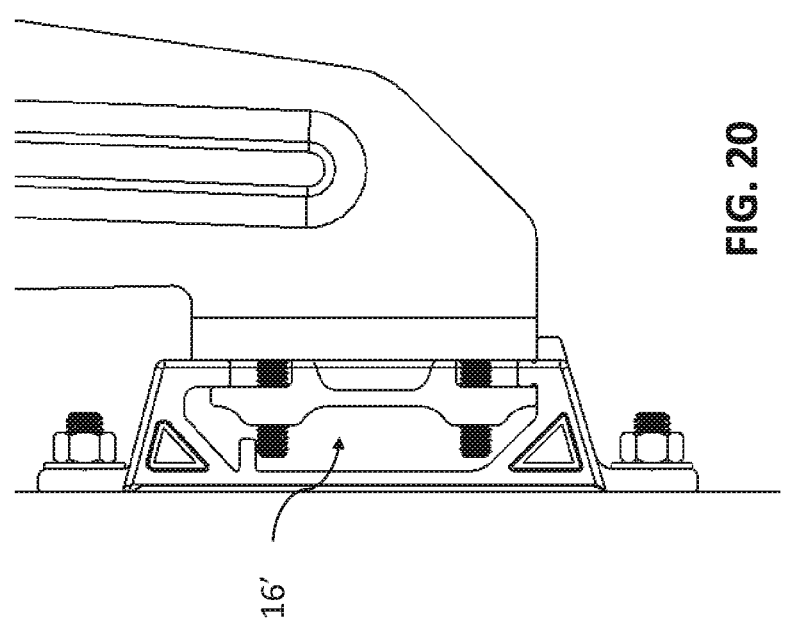

FIG. 20-21 shows an alternative connector 16'. The connector 16' includes posts 163'/163" adjacent to the threaded holes. In this case, the posts are positioned between but adjacent the respective threaded holes, but the reverse could also be used. The ends 162' and 164' are spaced in a manner similar to connector 16 in view of the internal dimensions of the beam cavity. The posts 163'/163" press against the face of plate 60 which is part of the chair support so that progressively tightening the bolts 10 does not continue to bend the plate 16' in that the posts bear directly against the face of the plate 60 such that the distance between the posts 163'/163" is minimized such that significant bending of the connector 16' is inhibited. However, the height of the post 163'/163" is about equal to or slightly smaller than the thickness of the portions of the beam which are clamped between the connector and the chair support (e.g. the rear face 362 of the part shown in FIG. 41 or similar face of other similar parts/portions of the chair and the portions of the beam 26/30 which define the narrowed opening into which the connector inserts as shown in FIGS. 7-9. This can inhibit failure of the system due to the warping of the connector. Further, between end 162' and center portion 165' is a thicker section 161' through which the threaded hole passes and a curved/fillet area is located between thicker section 161' and the end 162'. The other side of the connector 16' is shown with the same geometry. In this manner when faces 166' and 167' press against the interior of the beam to create the clamping action, the curved section along with the thicker section 161' tends to further inhibit bending/warping of the connector 16' while at the same time allowing for the ends 162'/164' to insert and fit into the beam channel/cavity during installation and the posts 163'/163" to bear against the rear of the plate 60. It is understood that certain drawings show connector 16' and others show connector 16, but that each figure/embodiment can use either connector 16 or 16'. Preferably, connector 16' is used though.

The distance from face 166' to the end of post 163' is equal to or less than the thickness of tab 24 and the same relationship holds true with respect to post 163" and face 167' as related to tab 30. Preferably, this distance is less than the tab 24/30 thickness in a manner which allows for sufficient clamping pressure to be generated between plate 60 and the connector. In this manner, the clamping pressure can be designed into the system to inhibit bending of the connector 16' during installation due to an installer being overly aggressive in their tightening in a manner that the tightening actually causes the connector 16' to bend. As can be seen, the connector 16' (and connector 16) allows for a bolt to secure thereto without use of separate nuts in that the threads are integrally cut into the connector. By using two threaded holes and corresponding bolts, tightening of one bolt uses the other bolt in part to inhibit rotation of the connector 16' (or 16) due to the torque on the first bolt. This allows the chairs (or other support items) to be secured to the beam with a minimum amount of pieces, particularly four bolts without the need for separate nuts. Thus, for each side of the chair to secure to the beam, only three separate parts (2 bolts, 1 connector) are required (six total parts per chair). This greatly simplifies installation.

Figure 23:
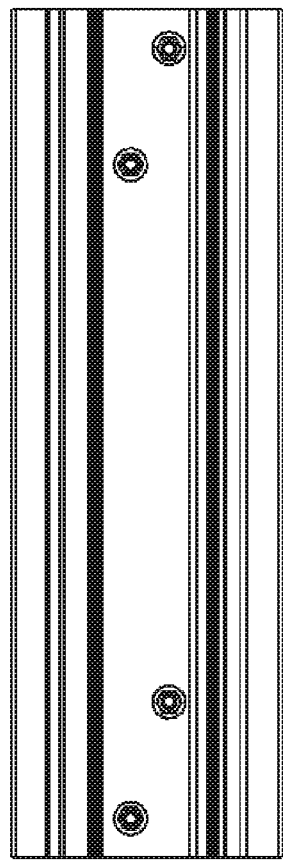
FIG. 23 shows a front view of a beam section depicting the mounding system of FIG. 22.
Figure 22:
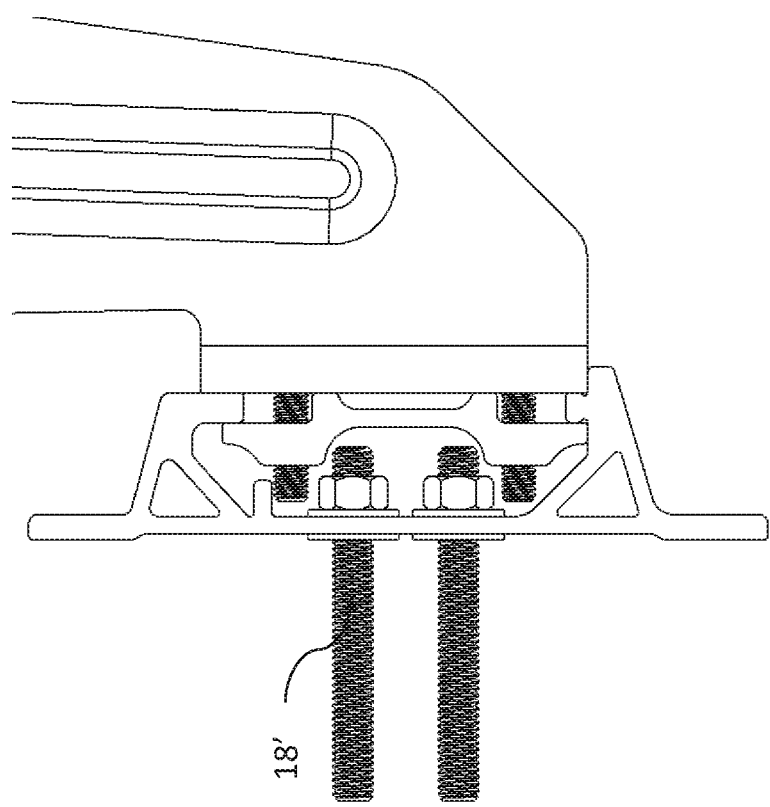
FIG. 22 shows a side view of an alternate anchoring configuration for the system of FIG. 1.

Referring to FIG. 22, in some cases, the concrete riser is too small to have the anchors positioned in tabs 40/42 of the beam. To that end, anchors 18' can be located in the interior space of the beam. It is further understood that a groove similar to groove 19 can be provided where anchors 18' are centered in the interior of the beam, specifically that a groove can extend along the longitudinal direction of the beam to allow the installer to drill the beam at a number of locations. In the configuration shown, typically, the upper and lower anchors would be offset (FIG. 23) with respect to each other in the longitudinal direction. It is also contemplated that combinations of the anchors positioned can be provided or that the beam can be provided without the tabs 40/42 shown, depending on the desired configuration, mounting requirements and riser height/position.

It is understood that other items may be mounted to the beam in addition to chairs by utilizing the same connector structure, but with different things supported from the connector. Particularly, items such as tables and railings can be mounted in addition to media and camera equipment. The beam and connector system disclosed herein can be adapted to releasably secure a variety of items to the beam in a modular and easy to modify manner.

Figure 24:
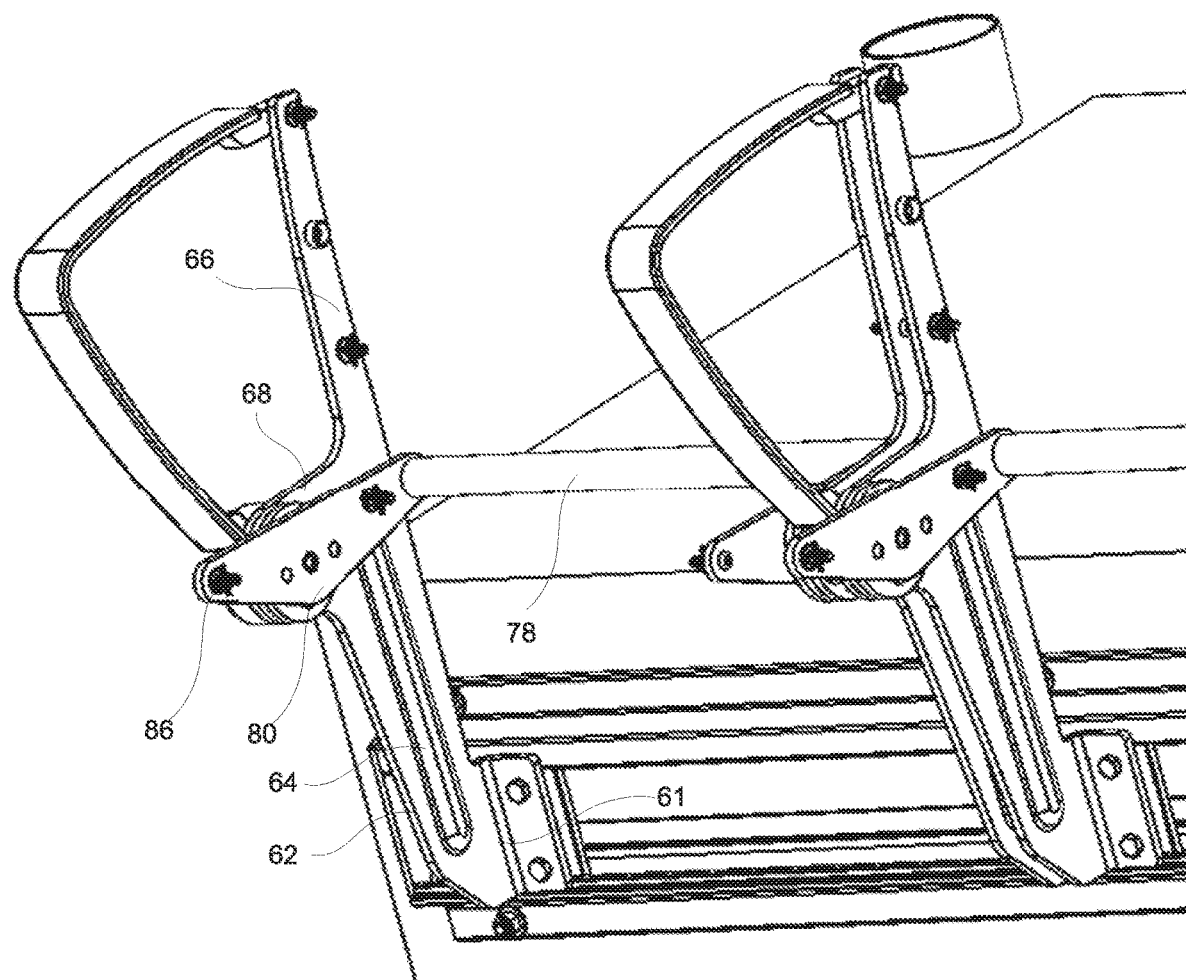
FIG. 24 is a perspective detail view of FIG. 1 with components of the chair removed.
Figure 31:
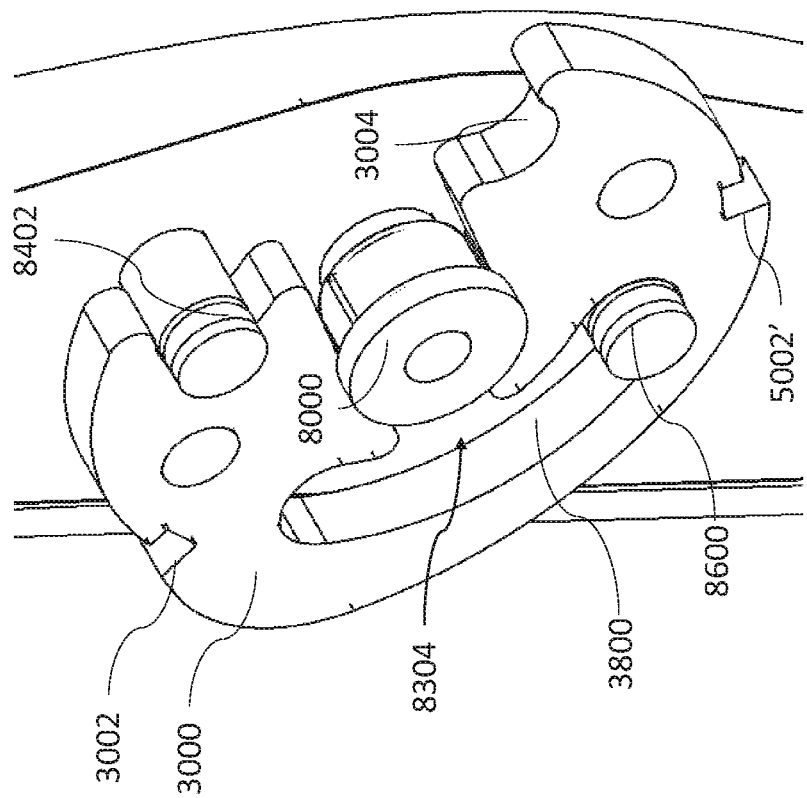
Figure 30:
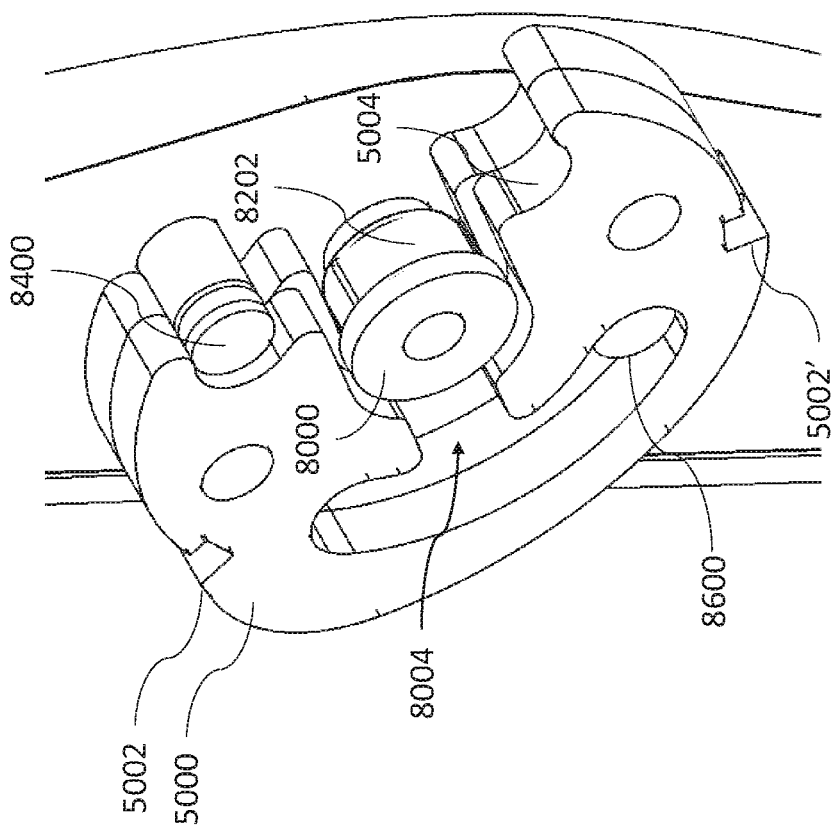
Figure 33:
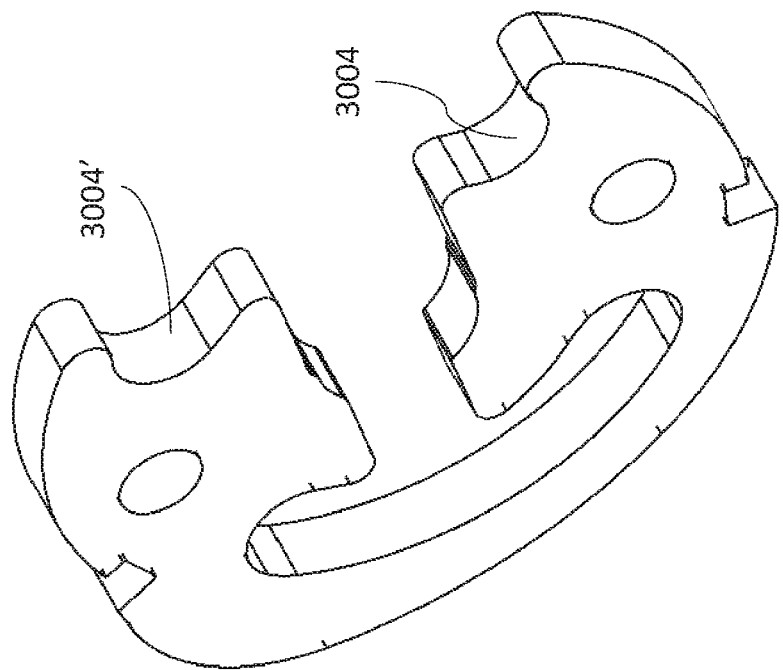
Figure 32:
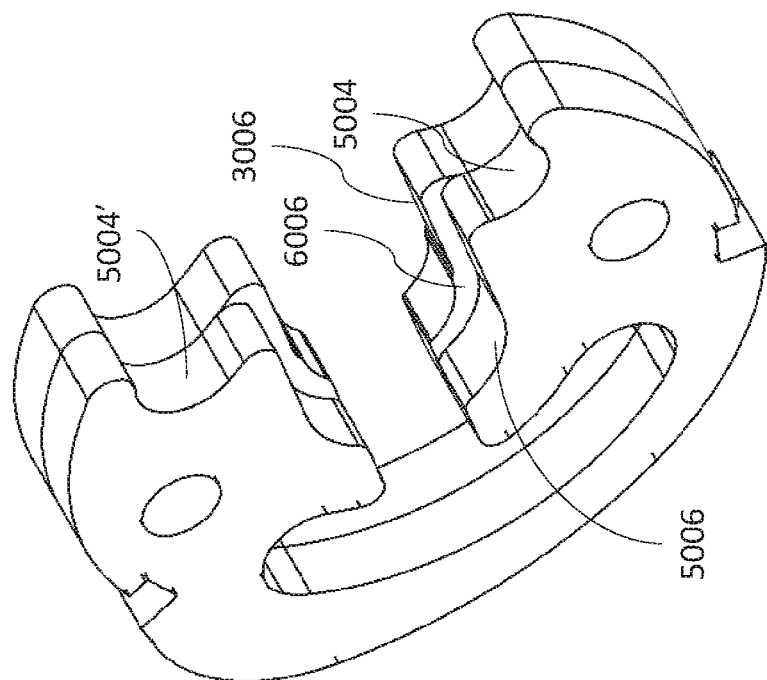

FIG. 24 shows the support 6 has a leg portion 62. A seat support portion 68 extends outwards with respect to the leg portion 62. A backrest support portion 66 extends above the leg portion 62 and the seat support portion 68. The plate 60 is cut on a 2d cutting machine (e.g. water jet/laser, plasma) and then formed by bend 61 (FIG. 24) and the depression/protrusion 64 (depending on which side the same is viewed from) is stamped in the support 6 to provide additional rigidity to the support frame 6. This depression/protrusion 64 includes a central generally planar/flat portion with a surrounding angled/curved portion. In certain aspects the connector 16 is not utilized with the beam mounting system and instead the plate 60 is simply bolted to the fixed support. As shown, the depression/protrusion 64 is generally located on the leg support 62 and is generally elongated in a vertical direction, terminating about at the center of the pivot 82 of the chair. More particularly, the depression/protrusion 64 is shown terminating below the backrest 10. The backrest portion 66 generally does not require added rigidity due to a stamping in that this backrest portion 66 is inhibited from buckling due to the backrest 10 being attached thereto. However, without the stamping which provides the depression/protrusion, the thickness of the support 6 would typically need to be greater to avoid instability/buckling issues under load. It is contemplated that a thicker support 6 or the stamping (or both) could be used, depending on the design requirements. But, typically, it would be preferable to use a thinner support 6 with the stamping to allow for material savings.

Although it is shown that the bend 61 is generally vertically located such that the plate 60 is on the rear end of the leg portion 62, it is also contemplated that the bend 61 could extend horizontally such that the plate extends from the bottom end of the leg portion 62 to act as a foot. In either case, the seat would be mounted/cantilevered to the fixed support by virtue of the plate 60 being fixedly secured directly or indirectly to the fixed support such that the seat is cantilevered from the plate 60.

Weight 78 is provided to secure to the seat (which may be blow molded) and allows the seat to rotate to the closed position automatically when un-occupied. Anchors 86 connect the plate 80 to the seat 8. Similar anchors mount the seat backrest 10.

Referring to FIGS. 25A-C and FIG. 26, the seat tilt mechanism is shown. Inner plate 3 includes curved channels 98/96 and outer plate 5 has similar channels but with a larger portion which receives bumper 92. Both plates 3/5 are cut from planar sheets and can be cut using two dimensional cutting tools such as a water jet or laser cutter. The plates are then stacked on top of each other with the bumper 92 inserted into one and the plates are bolted 100 to the frame 6 of the chair (specifically the seat support portion 68 of the frame 6). The bushing 102 rests in central hole 800 which pin 82 secured to plate 80 extends from. The bumper is roughly the same thickness as plate 5 and gets sandwiched between plate 3 and the support 6. Two additional pins 84/86 also extend from plate 80 (FIG. 26) and rotate through the channels 90, 98 and 96, 88. The outer view of the assembly with outer plate 17 removed is shown in FIGS. 25B and 25C. Channel 90 includes an enlarged opening 95 in the area of the bumper 92 and a narrowing portion 94 which narrows towards the enlarged area so that the bumper 92 can be slid laterally (in and out of the page) and then when the plate 5 is secured between frame 6 and inner plate 3, the bumper 92 is retained in opening 95. As the seat lifts up pin 84 hits bumper 92 which dampens the movement and absorbs energy and also inhibits noise to ensure quiet operation. FIG. 26 shows the pin plate 80 which includes pins 82, 84 and 86 secured thereto, for example, by welding or bolting. The seat pivots about pin 82 which is provided as a larger diameter as it bears more load than the other pins. Although shown with two outer pins 84/86 and two channels 90/88, the plates could be provided instead with only two pins (pin 82 and one more) and the plates could be provided with one channel and a hole for pin 82. However, the two pins 84/86 and corresponding channels provide added distribution of loading in the occupied position.

Figure 34:
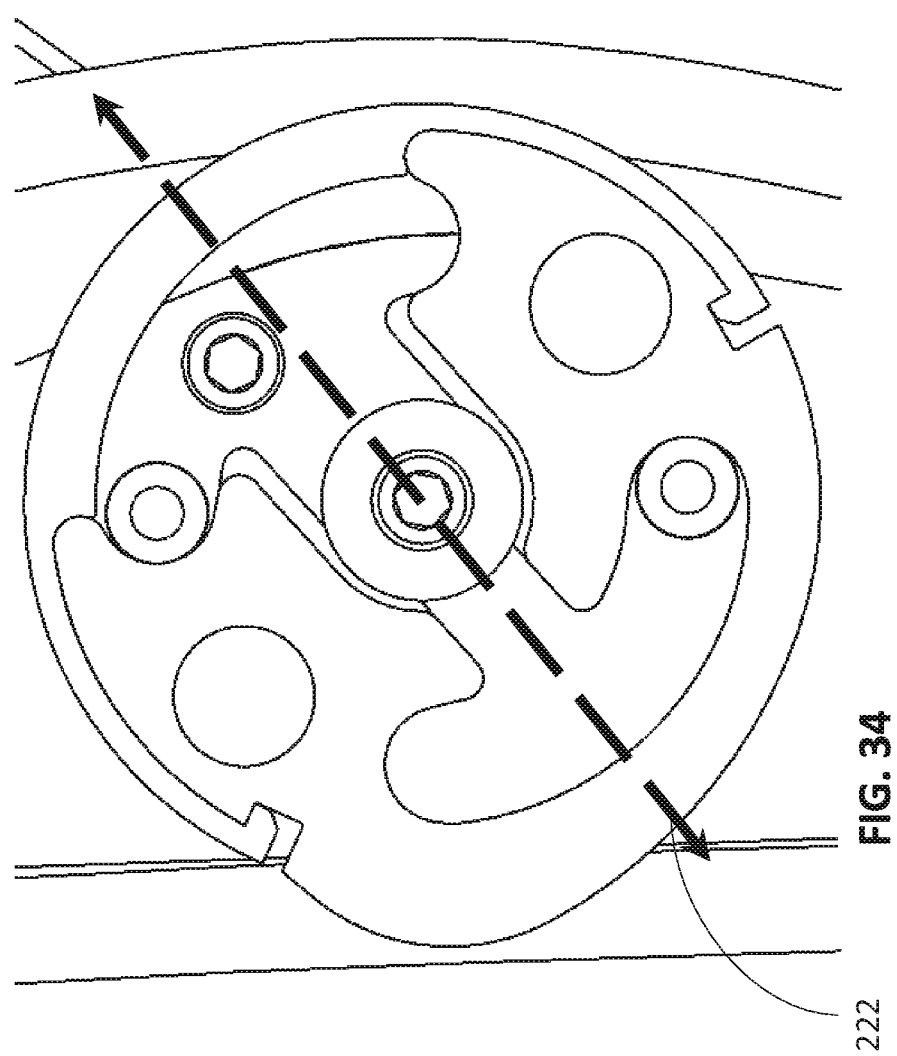

FIGS. 27-34 show an alternate seat tilt mechanism which is riveted 1000 to the support portion 68. FIG. 29 shows the support portion 68 and rivets 1000 removed and outer plate 5000 is shown with channel 8800 which allows pin 8600 to move therein back and forth between open and closed positions of the seat. Pin 8000 rests in the center pivot and includes a snap on bushing 8202 which is preferably made of plastic and is generally configured as a ring with a cut therethrough at one end to allow for snap on insertion by opening the cut to bend back the ring and placing it over the narrower portion of pin 8202 which is attached securely to the seat bottom. Opposite channel 8800 is a larger opening which allows for insertion of the pins 8600, 8400 and 8000 at an insertion angle (which may be a range of angles). When pin 8600 is aligned with space 8004 (with the seat about half way between open and closed positions) and the cap 7000 removed, the pins 8000, 8600 and 8400 can be slid out perpendicular to the rotation axis of pin 8000, or inserted in a similar way. FIG. 34 shows line 222 where when the centers of pins 8000, 8600 and 8400 are all aligned with that line 222, the seat can be moved out or in along the path of the line (once the cap is removed). Otherwise, the seat is retained in the bracket, particularly, pin 8600 inhibits removal.

Cap 7000 is preferably a plastic cap which has tabs which clip into openings 5002/5002' on the outer plate 5000 (similar openings also are provided in the inner plate 3000. The center pin 8000 is provided with a generally "T" shaped cross section. In this manner, the portion which receives the bushing 8202 will generally bear against the inner plate 3000 (through the bushing) to allow for rotation and the upper portion of the "T" shape will rotate within opening 5006 and be constrained from movement along the rotation axis by shelf 6006 which is defined by the difference in size between opening 3006 and 5006. As the seat bracket assembly shown in FIG. 27-34 is mirrored on the left side (right side is shown), the right side will inhibit movement of the pin 8000 towards the left and the left side will inhibit movement towards the right. In this manner, the left and right pin 8000 of the seat stay positioned within the bracket assembly. Stops are created by surfaces 5004, 3004 and 5004', 3004' and these sops interact with pin 8400 in the open and closed positions of the seat. Pins 8600 and 8400 are also preferably provided with bumpers thereon, in particular embodiments a rubber "0" ring works well to provide noise dampening and to avoid metal on metal contact as the pins hit the respective stops. Channel 8800 is provided with stops as the ends of the channel. In this bracket assembly, similar to the assembly shown in FIGS. 25A-C, the pieces 5000, 3000 can be cut from flat plate much like the rest of the chair and this allows for 2-d cutting tools such as water jet or laser cutting to be used in manufacturing. This provides a metal bracket but also allows for easy removal of the chair bottom from the bracket in a manner which allows for easier and more compact shipping of the chair in that the supports 6, chair back 10, seat bottom 8 can all be shipped disassembled and easily assembled together on-site. In addition, the modular nature of the seat back 10 and bottom 8 in relation to the supports 6 allows for different back/bottom configurations to be offered, but still be usable with the same frame. For example, a padded seat/back could be a more expensive option whereas blow molded (no padding) seat/back could be a less expensive option, but with both utilizing the same seat frame and bracket assembly.

Figure 47:
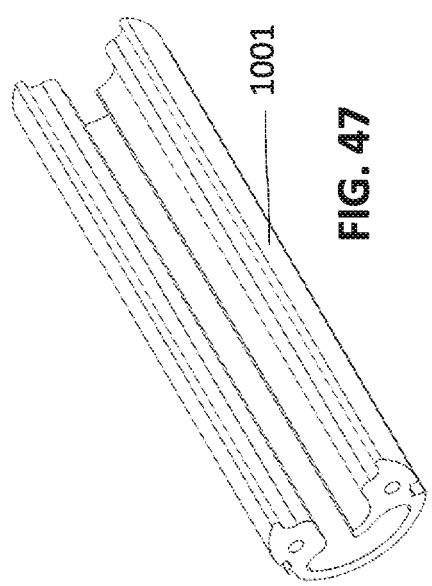
FIGS. 47 and 48 show perspective views of extrusions which can be used to make the chairs described and shown herein.

FIGS. 50-52 show an alternate single plate tilt bracket made from extrusion 1001 (FIG. 47). Pins 86/84 are provided and pin 82' is also provided with a "T" shaped cross section The relief cut 501 is machined from the extrusion 1001 and relief cuts 500 are also cut from the extrusion which is then fed longitudinally and cut off to create the bracket. Cap (FIG. 52) has nubs 500' which sit in notch 500 to inhibit movement along the rotation axis of the seat of the cap and then the catches at the end of the "C" shape fit into the corresponding notches in the bracket (FIG. 50) to cover the pin 84. This bracket is also attached to the support, preferably by rivets.

Referring to FIG. 35, an alternate chair is provided where frame 6 is still made from flat plate construction techniques but the connector piece 350 is separately attached with rivets 352 which pass through holes 354 and corresponding holes in the lower securing portion 60' of the frame pieces. Vertical face 356 is bounded by two vertical sides to accept the lower portion of frame 6 therein and vertical face 356 provides some bending/twist resistance against the frame piece. FIG. 39 depicts an alternate piece to piece 350 which has holes 354 also for rivets but also is provided with bosses 357/355 of different shapes such that the frame piece 6 is provided with corresponding holes to fit the bosses 357 and to align with holes 354 such that riveting and fitting is compatible in particular orientations to ensure proper assembly of the frame 6 to the plate 350'. Essentially, rivets would enter through holes 354 whereas the bosses/protrusions 357/355 would insert into correspondingly shaped holes/voids in the securing portion 60' of the frame pieces. These additional holes to receive the bosses 357/355 can also be cut during when the flat plates are cut using 2d cutting tools, e.g. laser or water jet cutting. Piece 350' is stamped and includes rib 358 which provides for added stiffness to the part 350'. Face 360 will abut the frame piece at the securing portion 60' with race 362 facing the beam/first support and connecting to the connector 16/16'. The riveting will provide a permanent connection between the parts whereas the connector 16/16' is releasably or removably secured to the chair with the bolts 10. Other riveting connections described herein are also considered permanent connections which would need some form of destructive force to separate parts.

FIG. 42 shows a side view of a beam which includes a hollow generally box section 422 co-extruded with the beam section 424 which generally matches that of FIG. 6. The bottom 426 of the box section 422 connects to legs 420 at intervals along the length of the beam, typically with bolts or rivets or the like. FIG. 43 shows an alternate embodiment of FIG. 42 where instead of face 428 being generally flat, that face includes beam section 424 which generally matches that of FIG. 6. In this manner, chairs can be mounted facing opposite directions, but mounted to the same structural support system. The connector 16' shown in FIG. 20-21 is shown installed in beam sections 424 but no chair is shown for purposes of saving illustration space, but it is understood that a chair (or other supported item) would connect to that connector in the manner previously described above. The beams which are co-extruded, especially that of FIG. 42 are especially useful in collapsing riser systems in that the co-extrusion can be integrated into the riser system to allow for chairs to be attached on an as-needed basis and still allow the stair/bleacher/riser system to be stored out of the way when necessary. The extrusion of FIG. 42 could be mounted to allow for floor (run) or riser mount on the bleacher system. An example bleacher system is shown in U.S. Pat. Nos. 8,407,943 and 5,069,007 and the content of these are incorporated by reference herein.

Figure 45:
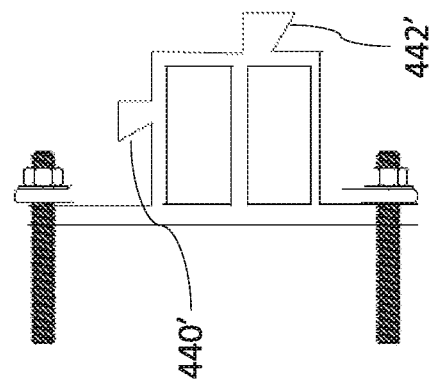
FIGS. 44-45 show a side views of alternate beam extrusions and clamps according to the present invention.
Figure 44:
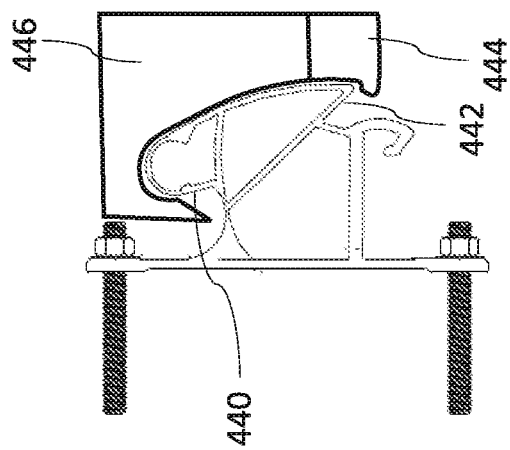

FIG. 44 shows an alternate beam configuration with catches 440 and 442 which interact with connector parts 446 and 444 which likewise secure to a chair. The catches 440 and 442 provide for generally rearward facing surfaces over which connector parts 446 and 444 will fit. Part 444 would be bolted to part 446 to thereby secure the chair (or supported item) to the beam. The beam of both FIGS. 44 and 45 is mounted directly to the support or riser using the shown anchors in a manner similar to that of previous figures.

Figure 46B:
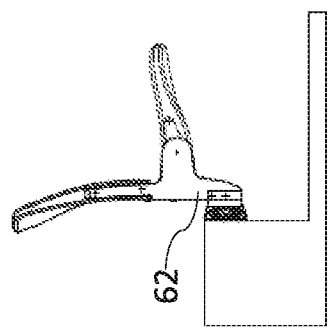
Figure 46C:
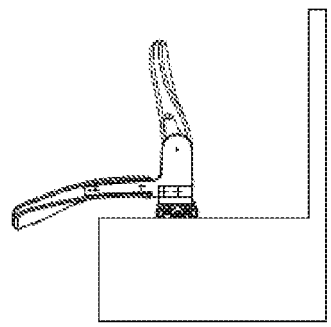
Figure 53:
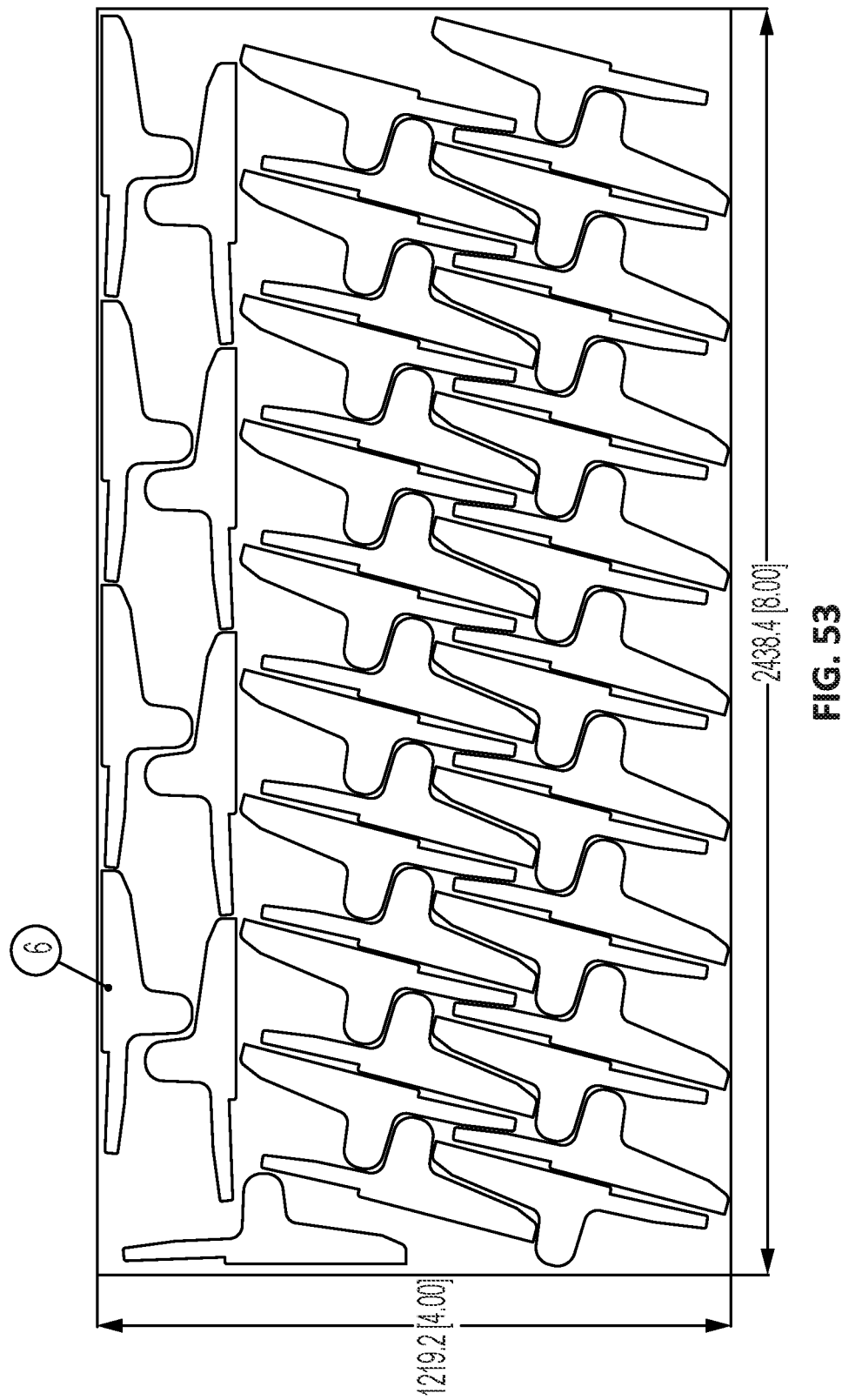
FIGS. 53-54 show a CAD file layout for cutting the supports.
Figure 54:
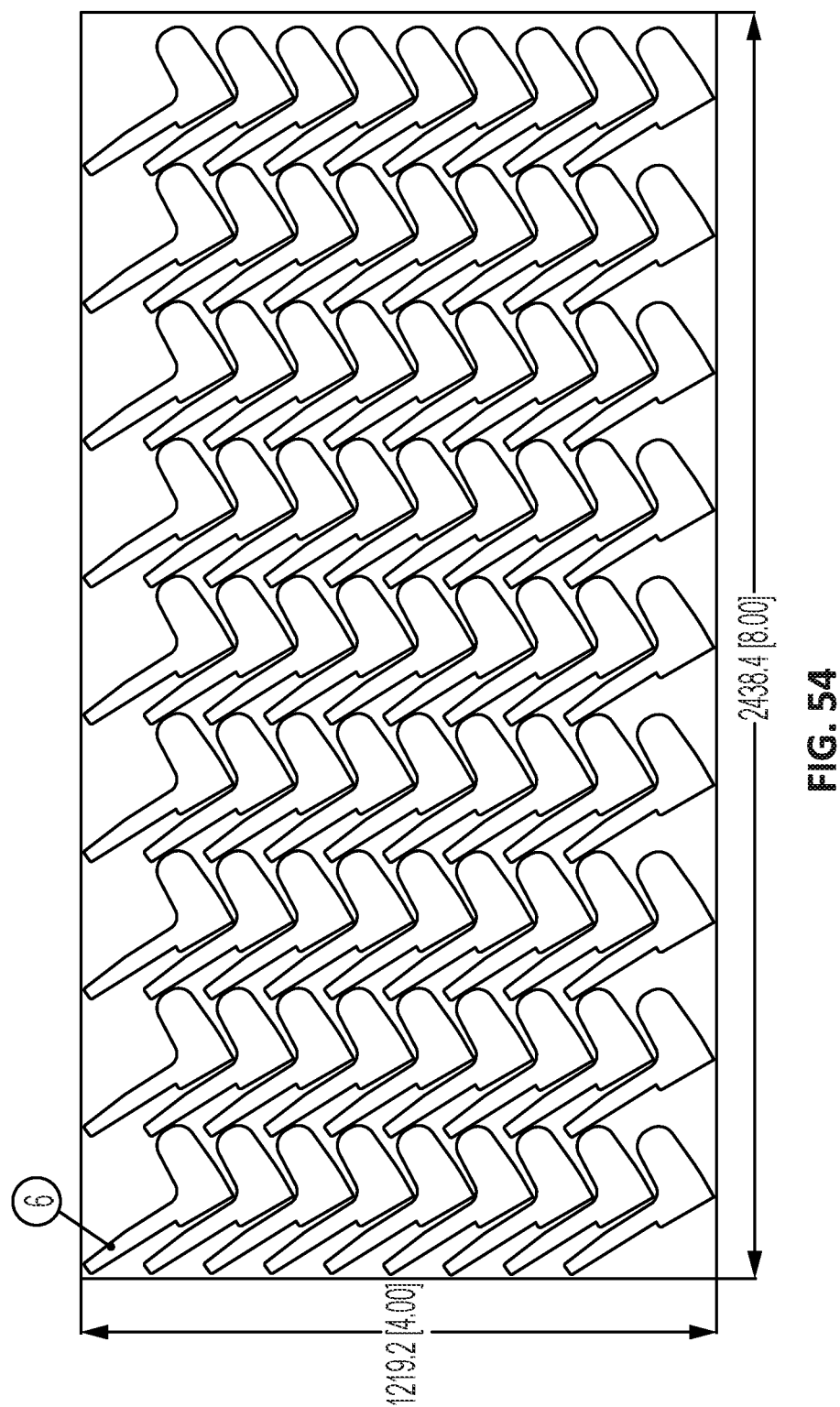

FIG. 46A-C shows certain flexibility gained in utilizing 2d cut parts for the chair supports in that leg section 62 length can be varied based on the riser height such that customizing the chair to meet the requirements of a particular stadium or auditorium simply requires modifying the length of the leg section 62 in the computer aided design (CAD) file for the support. Once modified, a layout can be generated with multiples of the support patterns on a single sheet of material which is then cut and the remaining pieces of the chair would remain the same. Certain prior art beam mounting systems which allow for attaching the chair at any point of the beam without interference from mounting supports to the riser typically utilize injection molded plastic parts to provide for clipping over the top of the beam and while this may mount the chair to the beam, the expense of changing the leg length for a different stadium design requires significant expense in re-tooling and making new molds. Thus, the flat plate construction provides the benefits of other beam systems which provide for mounting at any location along the beam but also provides for flexibility in design of the chairs and flexibility in the ability to easily modify the chair or support item heights/dimensions to accommodate different stadium/auditorium designs. Thus, in the larger riser variant (FIG. 46C, the leg section 62 length is significantly reduced or even possibly zero as compared to FIG. 46A which has a longer leg section 62. FIG. 53-54 shows two example CAD layouts for cutting a number of supports 6 on a 4'×8' flat plate.

Figure 48:
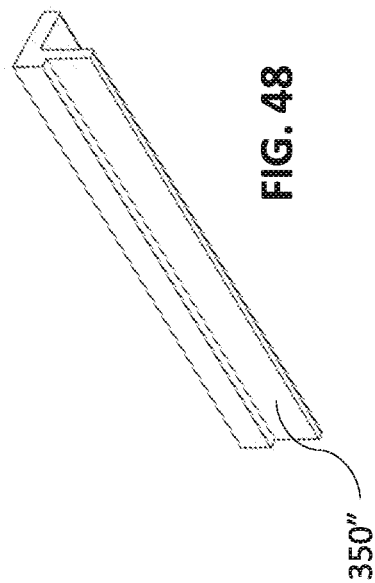
Figure 49:
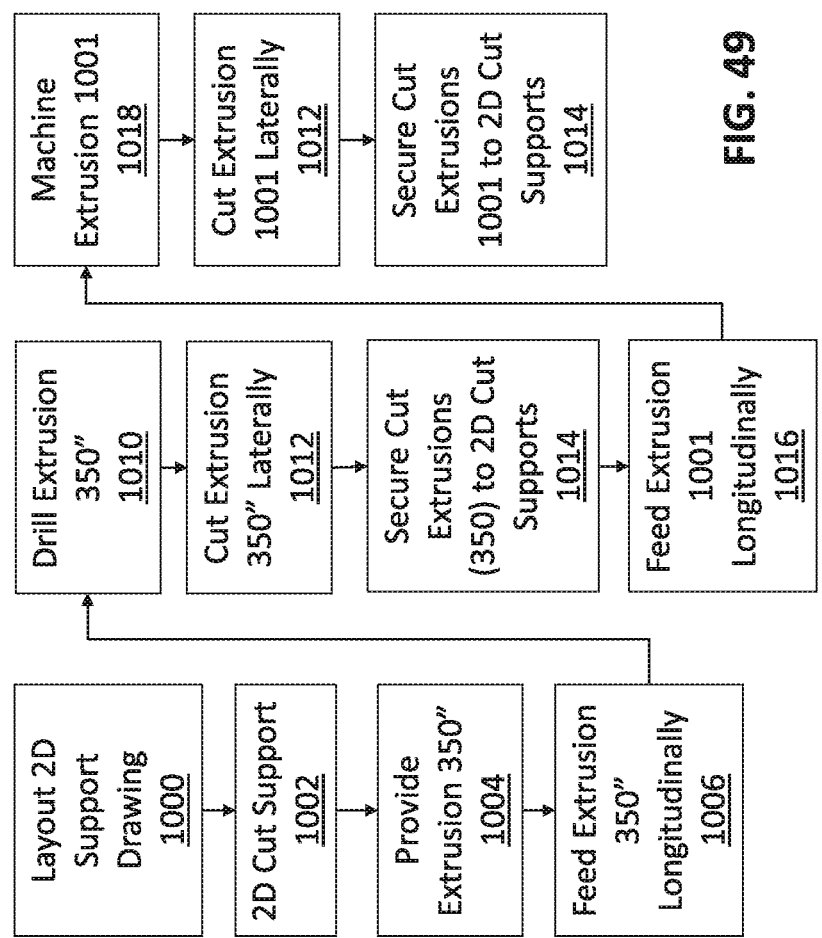
FIG. 49 is a process flow showing an embodiment of a manufacturing process of a chair described and shown herein.

FIGS. 47 and 48 show two extrusions used in the manufacturing process with extrusion 1001 being used to create the tilt bracket/hinge to allow the seating surface to tilt up/down. Extrusion 350" is used to create the bracket 350 which secures to the seat supports and to the beam with use of the connector 16'. The connector 16' would also be initially provided as an extrusion with the cross section shown. These long extrusions are fed, machined/drilled and cut over and over to mass produce the parts which make up the chair. Particularly, the extrusion for the connector 16' would be fed longitudinally, drilled to create a threaded hole and then fed longitudinally again and then cut off with the process repeating. As shown in FIG. 49, the process of creating the chairs involves creating a 2d layout of the support 1000 and cutting the support from a flat plate 1002 with multiple supports cut from the same flat plate. The extrusion 350" is provided 1004 and fed longitudinally 1006, it is then drilled for the rivet holes and the holes through which bolts secure to the threaded holes in the connector 16/16'. The extrusion 350" is fed 1006 again (not shown a second time) and the lateral cut 1012 is done to cut off the extrusion and create bracket 350. A similar process is provided for the extrusion 1001 (feeding 1016, machining 1018, feeding again, cutting laterally 1012). These now manufactured parts are secured 1014 to the 2d cut support. The remaining chair parts are added (e.g. back, seat, arms) and the chair can now be secured to the beam using the connectors 16/16'.

Importantly with all of the beams and variants which mount to a floor or riser as described herein, the face of the beam which faces the mounting surface is relatively close to that surface. Preferably, the spacing between the two facing surfaces of the beam and riser/support/floor only has spacers 186/184 there between in order to minimize spacing between the beam and the riser/support/floor. Doing this allows for the beam to act more as an extension of the riser/floor/support, thus transferring its stiffness to the length of the beam. Generally, the spacing between the two facing surfaces of the beam and riser/support/floor is less than 50% of a maximum outward projection distance of the beam. In more preferred embodiments, this distance is less than 25% the maximum projection, more particularly less than 15% of the maximum projection. In preferred embodiments this minimized distance applies along more than 40% of the length of the beam, more particularly more than 60% of the length of the beam, even more particularly more than 80% of the length of the beam and more preferably more than 90% of the length of the beam. In this manner, the spacers 184/186 are generally clamped between the beam and the riser/support/floor substantially along the entire length of the beam. Furthermore, the ability for an installer to locate the notch 19 in the beam (which is understood to be an option in all beam variants), the installer can locate places where the beam may need additional support or where undesirable flexing occurs and a hole can be drilled through the beam at the appropriate location and also into the concrete, and an anchor installed.

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A beam seating system comprising:
a frame supporting a seating surface;
a beam which is an extrusion and includes a channel in the extrusion, the beam configured to secure to a first support with a first face of said beam facing said first support, said beam extending in a longitudinal direction, the channel located in a second face of the beam;
said frame having a lower portion with a connector, the connector insertable into said channel from a direction which is transverse to the longitudinal direction and the connector, once inserted into said channel, retained from removal out of said channel in a linear direction transverse to the longitudinal direction wherein the beam includes at least one tab defining the channel such that the channel is narrower at the tab compared to a position in the channel deeper than the tab.

2. The system of claim 1 wherein said channel extends in the longitudinal direction.

3. The system of claim 1 further comprising a tab extruded as part of the beam and extending in the longitudinal direction, the tab comprising a notch therein, the notch extending in the longitudinal direction.

4. The system of claim 1 wherein said connector secures the frame to the beam by clamping the beam by and between the connector and the frame.

5. A beam seating system comprising:
a frame supporting a seating surface;
a beam which is an extrusion and includes a channel in the extrusion, the beam configured to secure to a first support with a first face of said beam facing said first support, said beam extending in a longitudinal direction, the channel located in a second face of the beam;
said frame having a lower portion with a connector, the connector insertable into said channel from a direction which is transverse to the longitudinal direction and the connector, once inserted into said channel, retained from removal out of said channel in a linear direction transverse to the longitudinal direction;
a plurality of holes in said beam and spaced along said longitudinal direction and located within the channel and extending through the beam and said beam secures to said first support through the holes with anchors.

6. The system of claim 5 wherein the beam includes at least one tab defining the channel such that the channel is narrower at the tab compared to a position in the channel deeper than the tab.

7. The system of claim 6 wherein the tab is configured to be clamped by and between the channel and the frame to secure the frame to the beam.

8. A beam seating system comprising:
a frame supporting a seating surface;
a beam which is an extrusion and includes a channel in the extrusion, the beam configured to secure to a first support with a first face of said beam facing said first support, said beam extending in a longitudinal direction, the channel located in a second face of the beam;
said frame having a lower portion with a connector, the connector insertable into said channel from a direction which is transverse to the longitudinal direction and the connector, once inserted into said channel, retained from removal out of said channel in a linear direction transverse to the longitudinal direction;
a tab extruded as part of the beam and extending in the longitudinal direction, the tab comprising a plurality of holes therein which are spaced along the longitudinal direction.

9. A beam seating system comprising:
a frame supporting a seating surface;
a beam which is an extrusion and includes a channel in the extrusion, the beam configured to secure to a first support with a first face of said beam facing said first support, said beam extending in a longitudinal direction, the channel located in a second face of the beam;
said frame having a lower portion with a connector, the connector insertable into said channel from a direction which is transverse to the longitudinal direction and the connector, once inserted into said channel, retained from removal out of said channel in a linear direction transverse to the longitudinal direction
wherein said connector secures the frame to the beam by clamping the beam by and between the connector and the frame;
wherein the connector includes a threaded hole and a bolt and the frame includes a first face with a hole, the bolt passing through the hole and into the threaded hole and the first face and the connector clamp the beam to secure the frame to the beam.

10. A beam seating system comprising:
a beam which is an elongate extrusion and the extrusion includes a channel therein, the channel extends along a longitudinal direction of the beam;
a plurality of seats, each comprising a frame supporting a seating surface, the plurality of seats configured to secure to the beam at the channel;
the beam configured to secure to a first support with anchors which pass through the beam and with a first face of said beam facing said first support with a distance between the first support and the first face less than a maximum amount which the beam protrudes with respect to the first support.

11. The system of claim 10 wherein the first support comprises concrete.

12. The system of claim 10 said frame having a lower portion including a connector, the connector insertable into said channel from a direction which is transverse to the longitudinal direction and the connector, once inserted into said channel, retained from removal out of said channel in a linear direction transverse to the longitudinal direction.

13. A beam seating system comprising:
a frame supporting a seating surface;
a beam which is an extrusion and includes a channel in the extrusion, said beam extending in a longitudinal direction, the channel located at a second face of the beam and being elongated in the longitudinal direction, the beam configured to secure to a first support via through holes in the beam which secure to the first support and the beam configured to secure to the first support with a first face of said beam facing said first support;
said frame having a lower portion with a connector, the connector securable to said beam at said channel from a direction other than the longitudinal direction and the connector, once secured to said beam, retained from removal from said channel in a linear direction transverse to the longitudinal direction.

14. The system of claim 13 wherein the beam is secured to the first support with a distance from the first face to the first support being less 50% of a maximum protrusion of the beam measured perpendicular to the first support.

15. The system of claim 14 further comprising a plurality of non-metallic spacers clamped by and between the beam and the first support.

16. The system of claim 15 wherein one or more of the plurality of non-metallic spacers includes a hole therein which aligns with at least one of the through holes such that anchors pass through the hole in the non-metallic spacer and the at least one of the through holes.

17. A beam seating system comprising:
a plurality of chairs, each having at least one connector;
an elongate beam having a first face and being an extrusion, the extrusion including a protrusion extending from an upper side of a second face of the beam, the protrusion configured to be clamped by and between each one of the connectors and each one of a first support for each one of the plurality of chairs to secure each of the plurality of chairs to the elongate beam;
the elongate beam configured to secure to a second support such that the first face faces the second support;
wherein the beam further comprises a plurality of holes therein which are spaced in a longitudinal direction of the beam and anchors are configured to secure the beam to the second support through the plurality of holes.

18. The system of claim 17 wherein the first support comprises concrete.

19. A beam mounting system for chairs comprising:
a beam which is an extrusion and has a longitudinal channel in a front face of the extrusion, the channel extending in a longitudinal direction, the beam securable to a first support;
a chair having a connector including upper and lower portions, the connector configured to secure to the beam by the connector inserting the upper and lower portions into the channel from the front face at any position along said beam, the connector slidable within the channel in the longitudinal direction without interference from the first support and the connector slidable until the connector is securely affixed to the beam with a fastener such that the connector ceases to be slidable in the longitudinal direction;
wherein when the connector is securely affixed to the beam the connector secures to the beam without interaction with a rear face of the beam;
wherein the beam further comprises a plurality of holes therein which are spaced in a longitudinal direction of the beam and anchors are configured to secure the beam to the first support through the plurality of holes.

20. The system of claim 19 wherein the second support comprises concrete.

* * * * *